United States Patent
Kang et al.

(10) Patent No.: US 10,636,167 B2
(45) Date of Patent: Apr. 28, 2020

(54) METHOD AND DEVICE FOR DETERMINING DISTANCE

(71) Applicant: Samsung Electronics Co., Ltd., Suwon-si, Gyeonggi-do (KR)

(72) Inventors: Seok-myong Kang, Hwaseong-si (KR); Yoon-suk Lee, Seoul (KR); Jong-woo Lee, Seongnam-si (KR); Jong-gu Jeon, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 246 days.

(21) Appl. No.: 15/672,807

(22) Filed: Aug. 9, 2017

(65) Prior Publication Data
US 2018/0137648 A1 May 17, 2018

Related U.S. Application Data

(60) Provisional application No. 62/421,682, filed on Nov. 14, 2016.

(30) Foreign Application Priority Data

Mar. 10, 2017 (KR) ........................ 10-2017-0030533

(51) Int. Cl.
*G06K 9/00* (2006.01)
*G06T 7/73* (2017.01)
(Continued)

(52) U.S. Cl.
CPC .............. *G06T 7/74* (2017.01); *G06K 9/0061* (2013.01); *G06K 9/00604* (2013.01); *G06K 9/209* (2013.01); *G06T 7/60* (2013.01); *H04N 5/232* (2013.01); *H04N 5/23219* (2013.01); *H04N 5/23293* (2013.01); *H04N 5/232939* (2018.08);
(Continued)

(58) Field of Classification Search
None
See application file for complete search history.

(56) References Cited

U.S. PATENT DOCUMENTS 8,310,585 B2 11/2012 Lee et al.
2014/0200080 A1* 7/2014 Kim ...................... G06F 3/0304
463/32
(Continued)

FOREIGN PATENT DOCUMENTS

KR 10-0836479 B1 6/2008

OTHER PUBLICATIONS

Yu ("Viewing Distance Measurement Using a Single Camera", IEEE, 2014, pp. 512-515) (Year: 2014).*

*Primary Examiner* — Wei Wen Yang
(74) *Attorney, Agent, or Firm* — Jefferson IP Law, LLP

(57) ABSTRACT

A method and device for determining a distance are provided. The method includes determining a first binocular distance between two eyes of a user by using a first image captured through a camera of the device, determining a second binocular distance between the two eyes of the user by using a second image captured through the camera, determining a distance from the camera to the two eyes of the user based on the first binocular distance and the second binocular distance, and providing an image to a display of the device, the image converted according to the distance from the camera to the two eyes of the user.

21 Claims, 21 Drawing Sheets

(51) Int. Cl.
　　　*H04N 5/232*　　　(2006.01)
　　　*G06T 7/60*　　　　(2017.01)
　　　*G06K 9/20*　　　　(2006.01)
(52) U.S. Cl.
　　　CPC .............. *G06T 2207/10004* (2013.01); *G06T 2207/10016* (2013.01); *G06T 2207/30201* (2013.01)

(56) References Cited

U.S. PATENT DOCUMENTS

2014/0240471 A1* 8/2014 Srinivasa ........... H04N 5/23293
　　　　　　　　　　　　　　　　　　　　348/50
2015/0374224 A1* 12/2015 Baranton ............. A61B 3/0091
　　　　　　　　　　　　　　　　　　　　351/206
2016/0042501 A1　 2/2016 Huang et al.
2017/0285736 A1* 10/2017 Young ..................... G06F 3/013
2018/0031848 A1*　2/2018 Huang ................. G02B 27/017

* cited by examiner

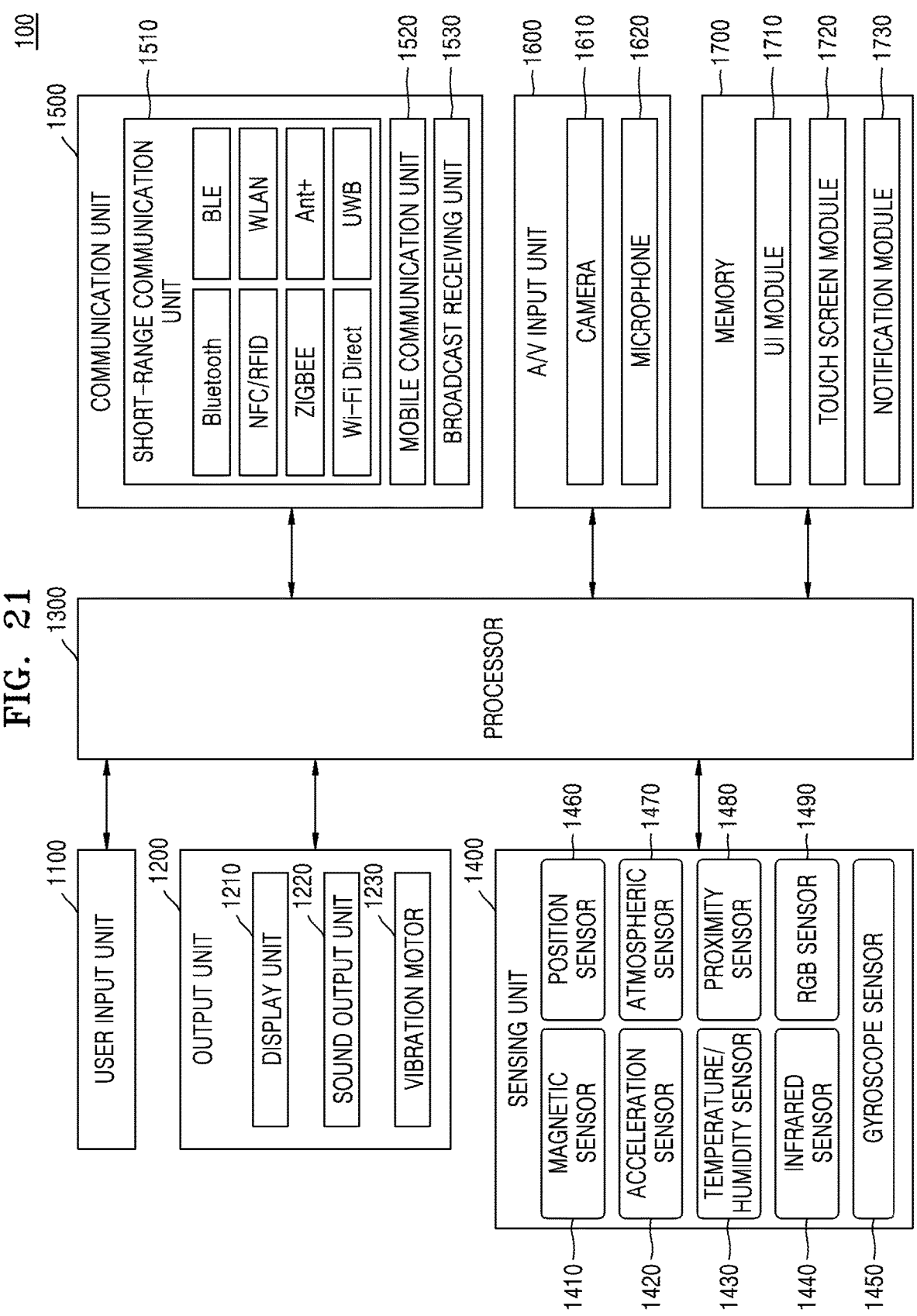

METHOD AND DEVICE FOR DETERMINING DISTANCE

CROSS-REFERENCE TO RELATED APPLICATION(S)

This application claims the benefit under 35 U.S.C. § 119(e) of a U.S. Provisional application filed on Nov. 14, 2016, in the U.S. Patent and Trademark Office and assigned Ser. No. 62/421,682, and under 35 U.S.C. § 119(a) of a Korean patent application filed on Mar. 10, 2017, in the Korean Intellectual Property Office and assigned Serial No 10-2017-0030533, the entire disclosure of each of which is hereby incorporated by reference.

TECHNICAL FIELD

The present disclosure relates to a method and a device for determining a distance. More particularly, the present disclosure relates to a method and a device for determining a distance by using a camera.

BACKGROUND

Various methods are used to measure a distance to a subject. For example, a method of using light in order to measure a distance to a subject is widely used. Examples of a method of measuring a distance by using light include a triangulation method, a time-of-flight (TOF) method, and a phase-shift method.

The triangulation method is a method of measuring a distance by using triangulation, and the TOF method is a method of calculating a distance by using a difference between a time when light is emitted from a distance measuring apparatus and a time when the light returns to the distance measuring apparatus after being reflected from a subject. The phase-shift method is a method of calculating a distance based on phase-shift between reference light and light that has returned to a distance measuring apparatus after being reflected from a subject due to irradiation of light having a uniform frequency to the subject.

Alternatively, a method of measuring a distance to a subject by using a plurality of images obtained through a plurality of cameras may be used. For example, stereo matching using a stereo camera is a process of recognizing a 3-dimensional (3D) structure by using two eyes of a person, which is realized in terms of hardware, and is a method of extracting information about a depth (or a distance) in a space through a process of analyzing a pair of images obtained by photographing one subject using two cameras. By calculating a value obtained from an input image, 3D distance information of an observation space may be measured.

However, according to such general technologies, complicated hardware structures are required while irradiating and receiving special light or using a plurality of cameras.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a device for determining a distance through two or more photographing operations.

Another aspect of the present disclosure is to provide a method and a device for obtaining sensed information from a sensor and determining a distance by using the sensed information.

In accordance with an aspect of the present disclosure, a method by which a device determines a distance is provided. The method includes determining a first binocular distance between two eyes of a user by using a first image captured through a camera of the device, determining a second binocular distance between the two eyes of the user by using a second image captured through the camera, determining a distance from the camera to the two eyes of the user based on the first binocular distance and the second binocular distance, and providing an image to a display of the device, the image converted according to the distance from the camera to the two eyes of the user.

In accordance to another aspect of the present disclosure, a device for determining a distance is provided. The device includes a camera configured to photograph two eyes of a user, and a processor configured to determine a first binocular distance between the two eyes of the user by using a first image captured through the camera, determine a second binocular distance between the two eyes of the user by using a second image captured through the camera, determine a distance from the camera to the two eyes of the user based on the first binocular distance and the second binocular distance, and provide an image to a display of the device, the image converted according to the distance from the camera to the two eyes of the user.

In accordance with another aspect of the present disclosure, a non-transitory computer-readable recording medium has recorded thereon a program which, when executed by a computer, performs the method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 20 and 21 are block diagrams of devices according to various embodiments of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the specification, when a region is "connected" to another region, the regions may not only be "directly connected," but may also be "electrically connected" via another device therebetween. Also, when a region "includes" an element, the region may further include another element instead of excluding the other element, otherwise differently stated.

As used herein, the term "and/or" includes any and all combinations of one or more of the associated listed items. Expressions such as "at least one of," when preceding a list of elements, modify the entire list of elements and do not modify the individual elements of the list.

Hereinafter, examples of the present inventive concept will be described with reference to accompanying drawings.

Figure 1:
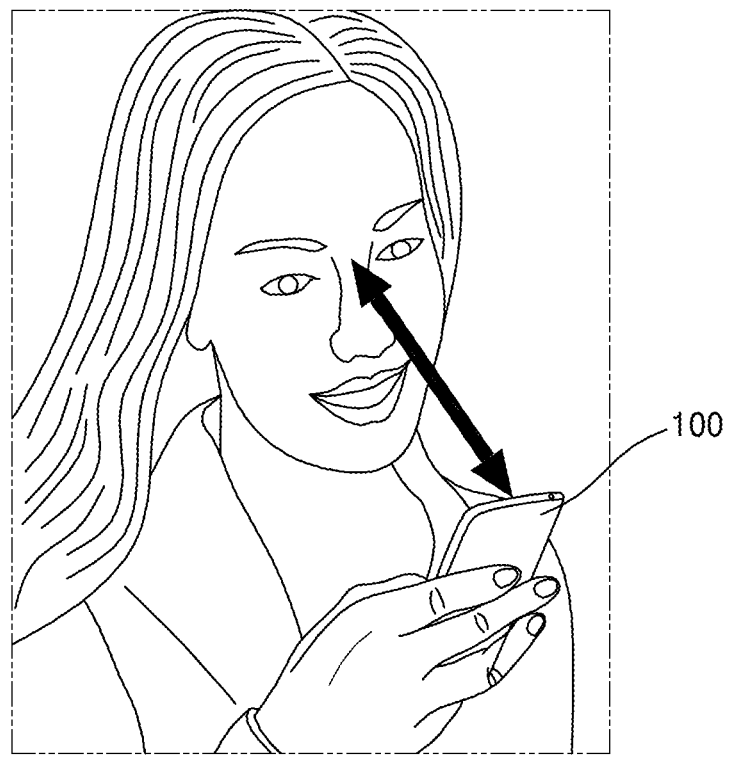
FIG. 1 is a diagram for describing an example in which a device determines a distance from the device to a user, according to an embodiment of the present disclosure.

FIG. 1 is a diagram for describing an example in which a device determines a distance from the device to a user, according to an embodiment of the present disclosure. For example, the device may determine a distance from a lens of a camera included in the device to two eyes of the user.

Referring to FIG. 1, a device 100 according to an embodiment may determine a distance by using one camera. For example, the device 100 may determine the distance from the lens of the camera to the two eyes of the user through two or more photographing operations using one camera included in the device 100. The device 100 may determine the distance from the lens of the camera to the two eyes of the user by comparing information about the two eyes of the user obtained through first photographing and second photographing.

For example, the device 100 may determine a first binocular distance between the two eyes of the user by using a first image captured by the camera, determine a second binocular distance between the two eyes of the user by using a second image captured by the camera, and determine the distance from the camera to the two eyes of the user based on the first and second binocular distances. For example, the device 100 may determine the distance from the camera to the two eyes of the user by comparing the first binocular distance that is the distance between the two eyes of the user with the second binocular distance that is the distance between the two eyes of the user, wherein the first binocular distance and the second binocular distance are recognized by an image sensor of the camera when the first image and the second image are captured, respectively. As another example, the device 100 may determine the distance from the camera to the two eyes of the user by comparing the first binocular distance that is the distance between the two eyes of the user in a focal plane of the camera when the first image is captured, with the second binocular distance that is the distance between the two eyes of the user in the focal plane of the camera when the second image is captured.

The device 100 according to an embodiment may provide an image converted according to the distance from the camera to the two eyes of the user, to a display of the device 100. For example, the device 100 may process the image to be displayed on the display based on the distance from the camera to the two eyes of the user. The device 100 may use user information while processing the image. For example, the device 100 may process the image to be displayed on the display by using the distance from the camera to the two eyes of the user and visual acuity information of the user. An example thereof will be described later with reference to FIG. 13.

The device 100 according to an embodiment may obtain sensed information from a sensor, and determine a distance by using the sensed information. For example, the device 100 may obtain two images of the user through two or more photographing operations, obtain motion information of the device 100 from the sensor, and analyze a difference between the two obtained images based on the motion information, thereby determining the distance from the user to the device 100. For example, the device 100 may determine the distance from the lens of the camera to the two eyes of the user by using a distance between the two eyes of the user obtained through first photographing, a distance between the two eyes of the user obtained through second photographing, and a moving distance of the device 100 between the first photographing and the second photographing.

The device 100 according to an embodiment may determine an eyeball size of the user by photographing an eyeball of the user, predicting the eyeball size of the user by using the user information, and determining the distance between the device 100 and the user based on the determined eyeball size and the predicted eyeball size. The device 100 may determine the distance from the lens of the camera to the two eyes of the user by comparing the determined eyeball size and the predicted eyeball size.

The device 100 according to an embodiment may determine the distance between the device 100 and the user, and process the image to be displayed by using the determined distance. The device 100 may process the image to be displayed based on the visual acuity information of the user stored in the device 100, and the distance from the lens of the camera to the two eyes of the user. For example, the device 100 may determine a location of a focal plane of the image to be displayed, based on the visual acuity of the user and the distance from the lens of the camera to the two eyes of the user. For example, when the user is nearsighted, the device 100 may determine the location of the focal plane of the image to be displayed to be closer to the two eyes of the user than a location of the display. As another example, when the user is farsighted, the device 100 may determine the location of the focal plane of the image to be displayed to be farther from the two eyes of the user than the location of the display. As another example, the device 100 may determine directivity of light displayed on the display according to the visual acuity of the user.

Figure 2:
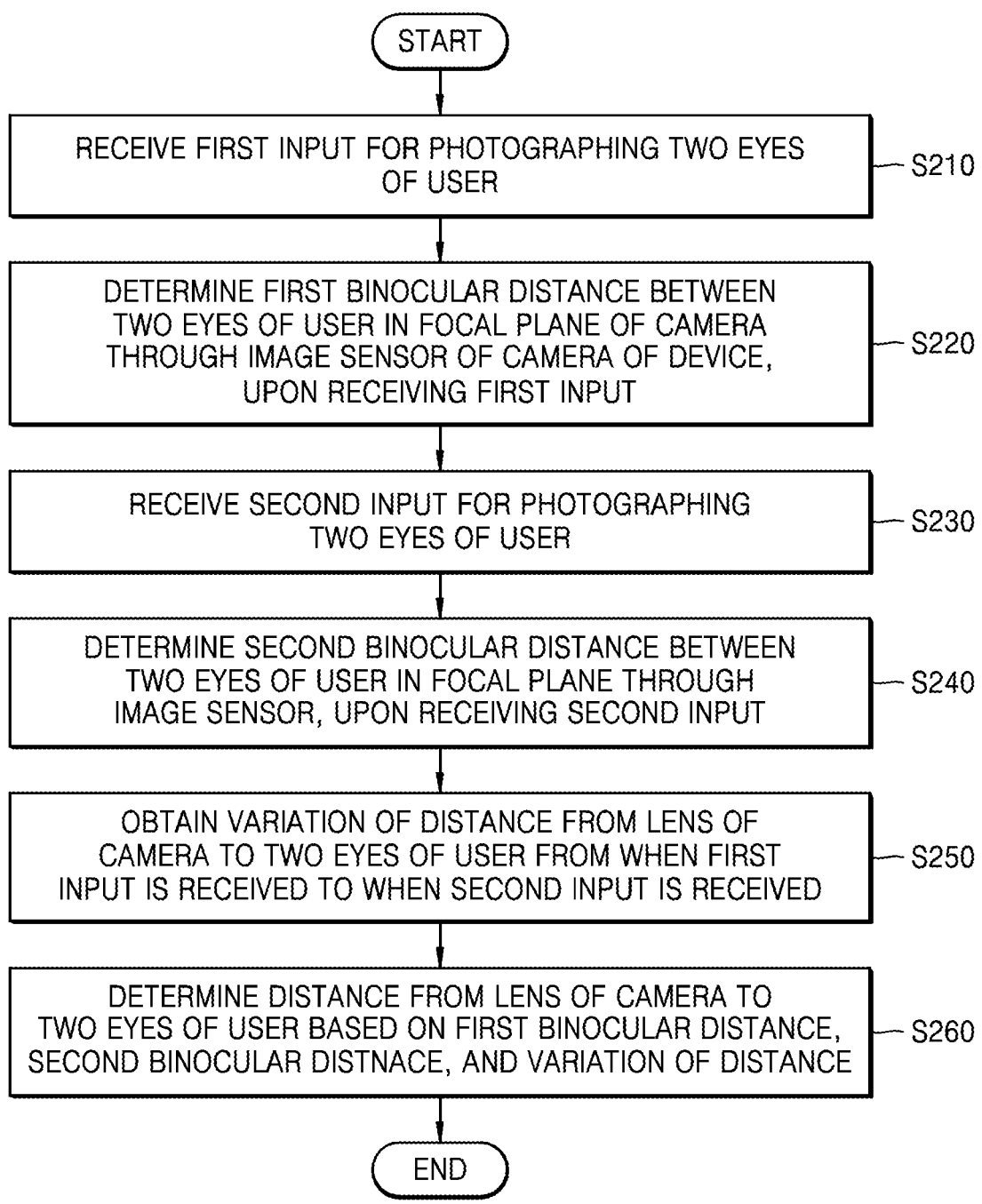
FIG. 2 is a flowchart of a method by which a device determines a distance from the device to a user, according to an embodiment of the present disclosure.

FIG. 2 is a flowchart of a method by which a device determines the distance from the device to the user, according to an embodiment of the present disclosure. For example, the device may determine the distance from the lens of the camera to the two eyes of the user by using one camera.

Referring to FIG. 2, the distance from the device 100 to the user may denote a distance from a pre-set portion of the device 100 to a pre-set body part of the user. For example, the distance from the device 100 to the user may denote the distance from the lens of the camera to the two eyes of the user. As another example, the distance from the device 100 to the user may denote a distance from the display included in the device 100 to the two eyes of the user. As another example, the distance from the device 100 to the user may denote a distance from a center of the display included in the device 100 to a portion of a face of the user, the portion of the face being closest to the display. However, examples of the distance from the device 100 to the user are not limited thereto.

In operation S210, the device 100 according to some embodiments may receive a first input for photographing the two eyes of the user.

The device 100 according to an embodiment may receive the first input used to photograph the two eyes of the user. For example, the device 100 may receive the first input requesting the device 100 to photograph the two eyes of the user. For example, the device 100 may photograph the two eyes of the user upon receiving a touch input of the user. As another example, the device 100 may receive the first input of requesting the device 100 to photograph the two eyes of the user when a pre-set application is performed, without any particular input from the user. The device 100 may receive the first input from an external source of the device 100 or obtain the first input from some components included in the device 100.

In operation S220, when the first input is received by the device 100, the first binocular distance between the two eyes of the user in the focal plane of the camera may be determined by the device 100, according to an embodiment, through the image sensor of the camera of the device 100.

The focal plane of the camera may denote a plane where incident light is gathered by the lens of the camera. For example, the focal plane may be a virtual plane where light incident through the lens is gathered when the lens of the camera is set to infinity.

The image sensor may be located in the focal plane of the camera. The image sensor may obtain an image by sensing the image formed on the image sensor.

The device 100 may determine, through photographing according to the first input, the first binocular distance that is the distance between the two eyes of the user in the focal plane of the camera. The first binocular distance may be the distance between the two eyes of the user in the focal plane of the camera at a point of time according to the first input. When the image sensor is located in the focal plane of the camera, a distance between an image of a first eyeball of the user and an image of a second eyeball of the user, which are formed on the image sensor through the photographing according to the first input, may be the first binocular distance. When the image sensor is located in the focal plane of the camera, the device 100 may determine the first binocular distance through the image sensor. The focal length of the camera may denote a distance from the lens of the camera to the focal plane of the camera or to the image sensor.

The camera may be located inside or outside the device 100. When the camera is located outside the device 100, the device 100 may obtain information sensed by the image sensor from the camera, and determine the first binocular distance by using the sensed information. Alternatively, when the camera is included in the device 100, the device 100 may determine the first binocular distance by using the camera inside the device 100.

In operation S230, the device 100 according to an embodiment may receive a second input for photographing the two eyes of the user.

The device 100 may receive the second input used to photograph the two eyes of the user after the first input is received. For example, the device 100 may sequentially receive the first and second inputs requesting the device 100 to photograph the two eyes of the user. For example, the device 100 may photograph the two eyes of the user according to a touch input of the user received after the first input is received. As another example, the device 100 may sequentially receive the first and second inputs when the pre-set application is performed, without a particular input from the user. The device 100 may receive the second input from an external source of the device 100 or obtain the second input from some components included in the device 100.

In operation S240, upon receiving the second input, the device 100 according to an embodiment may determine, through the image sensor, the second binocular distance between the two eyes of the user in the focal plane.

The device 100 may determine the second binocular distance that is the distance between the two eyes of the user formed on the focal plane of the camera, through photographing according to the second input. The second binocular distance may be the distance between the two eyes of the user in the focal plane of the camera at a point of time according to the second input. When the image sensor is located in the focal plane of the camera, a distance between an image of the first eyeball of the user and an image of the second eyeball of the user, the images being formed on the image sensor through the photographing according to the second input, may be the second binocular distance. When the image sensor is located in the focal plane of the camera, the device 100 may determine the second binocular distance through the image sensor.

The camera may be located inside or outside the device 100. When the camera is located outside the device 100, the device 100 may obtain information sensed by the image sensor from the camera, and determine the second binocular distance by using the sensed information. Alternatively, when the camera is included in the device 100, the device 100 may determine the second binocular distance by using the camera inside the device 100.

The first binocular distance and the second binocular distance may be different from each other. For example, the first and second binocular distances may be different from each other when distances from the lens of the camera to the two eyes of the user at a photographing time according to reception of the first input and at a photographing time according to reception of the second input are different from each other.

In operation S250, the device 100 according to an embodiment may obtain a variation of the distance between the device 100 and the user from when the first input is received to when the second input is received. The device 100 may detect motion of the device 100 from when the first input is received to when the second input is received, and obtain the variation of the distance based on the detected motion of the device 100. A point of time when the first input or the second input is received may include not only a physical point of time when the first input or the second input is received, but also a point of time when the device 100 performs a pre-set operation according to the first input or the second input. For example, the device 100 may obtain the variation of the distance from the lens of the camera to the two eyes of the user from the photographing time according to the reception of the first input to the photographing time according to the reception of the second input.

The device 100 may obtain the variation of the distance by using information obtained from the sensor. The sensor located inside or outside the device 100 may obtain sensing information. For example, the sensor may obtain motion information. When the sensor is located inside the device 100 or included in an apparatus like the device 100, motion detected by the sensor may indicate the motion of the device 100. In this case, the sensor may obtain motion information of the device 100. The sensor may obtain the motion information of the device 100, and the device 100 may obtain the motion information of the device 100 from the sensor.

The device 100 may determine a moving distance and a moving direction of the device 100 from the photographing time according to the reception of the first input to the photographing time according to the reception of the second input, by using the motion information obtained from the sensor. The device 100 may determine the variation of the distance from the lens of the camera to the two eyes of the user from the photographing time according to the reception of the first input to the photographing time according to the reception of the second input, according to the determined moving distance and moving direction.

The device 100 according to an embodiment may obtain the focal length of the camera. The focal length of the camera may denote a distance from the lens of the camera to the focal plane of the camera. Also, when the image sensor is located in the focal plane, the focal length of the camera or the focal length of the lens of the camera may denote the distance from the lens of the camera to the image sensor. The focal length of the camera may be determined according to hardware characteristics of the camera. For example, the focal length of the camera may be determined according to a refractive index of the lens of the camera. Information indicating the focal length of the camera may be stored in the device 100 or received from an external source of the device 100. The device 100 may determine the focal length of the camera according to the obtained information indicating the focal length of the camera.

In operation S260, the device 100 according to an embodiment may determine the distance between the device 100 and the user based on the first binocular distance determined in operation S220, the second binocular distance determined in operation S240, and the variation of the distance obtained in operation S250.

The device 100 may determine the distance from the lens of the camera to the two eyes of the user at the photographing time according to the reception of the first input and/or the distance from the lens of the camera to the two eyes of the user at the photographing time according to the reception of the second input, by comparing the first binocular distance and the second binocular distance. For example, the device 100 may determine the distance from the lens of the camera to the two eyes of the user at the photographing time according to the reception of the first input and/or the distance from the lens of the camera to the two eyes of the user at the photographing time according to the reception of the second input, by using the first binocular distance determined in operation S220, the second binocular distance determined in operation S240, and the variation of the distance and the focal length of the camera obtained in operation S250. An example of determining the distance from the lens of the camera to the two eyes of the user will be described below with reference to FIG. 3.

The distance between the two eyes of the user in the focal plane may denote the distance between images of the two eyes of the user in the focal plane.

The distance from the lens of the camera to the two eyes of the user may be defined according to a pre-set method. For example, the distance from the lens of the camera to the two eyes of the user may be a distance between the lens of the camera and a virtual segment connecting the two eyes. As another example, the distance from the lens of the camera to the two eyes of the user may be a shortest distance between a first plane parallel to the lens of the camera and located on the lens of the camera and a second plane parallel to the lens of the camera and including the two eyes of the user. However, examples of the distance from the lens of the camera to the two eyes of the user are not limited to the above.

Figure 3:
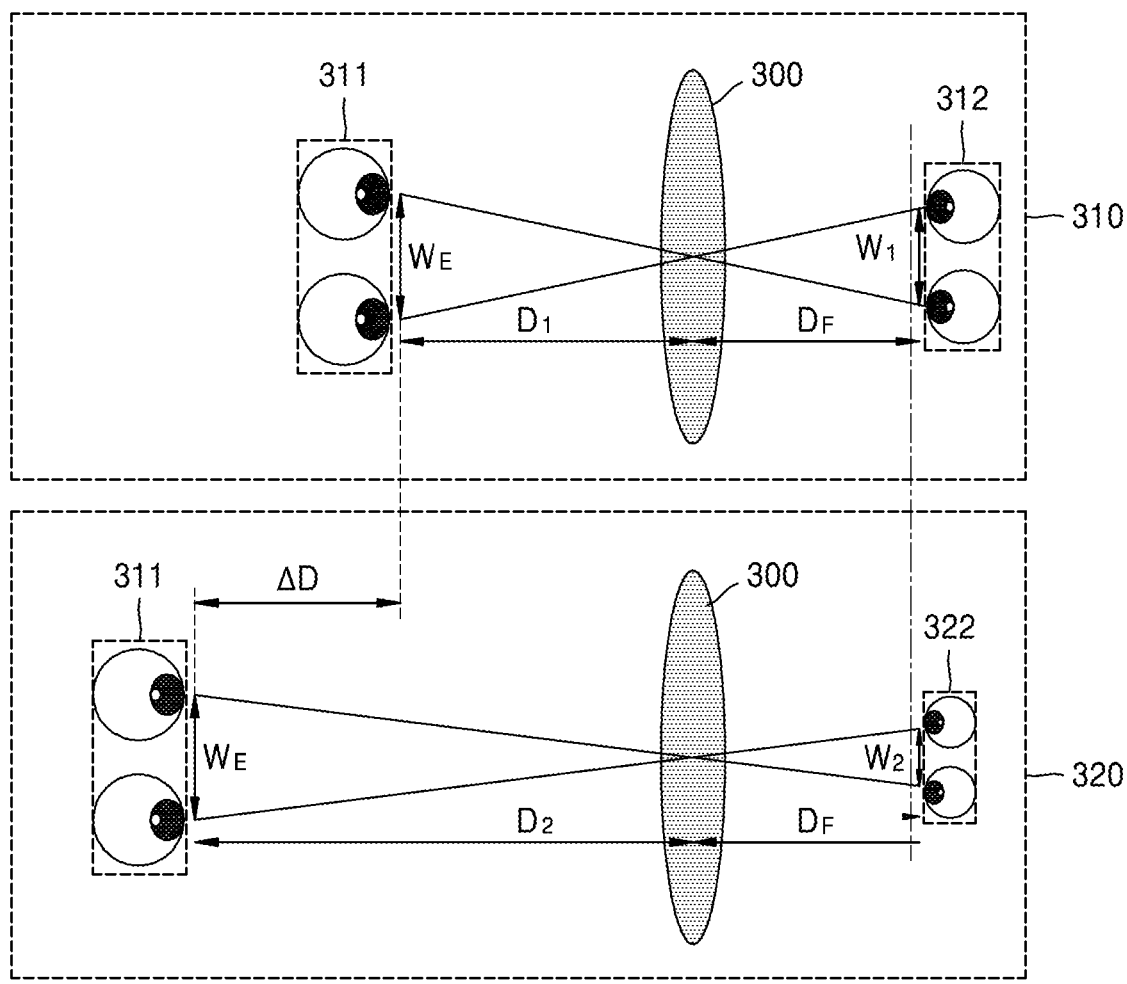
FIG. 3 is a diagram for describing an example in which a device determines a distance from the device to a user by using a first binocular distance and a second binocular distance, according to an embodiment of the present disclosure.

FIG. 3 is a diagram for describing an example in which a device determines the distance from the device to a user by using a first binocular distance and a second binocular distance, according to an embodiment of the present disclosure.

Referring to FIG. 3, the device 100 may determine a first binocular distance $W_1$ and a second binocular distance $W_2$ respectively in a first case 310 when two eyes 311 of the user are photographed at a first point of time and a second case 320 when the two eyes 311 of the user are photographed at a second point of time.

The device 100 according to an embodiment may obtain the first binocular distance $W_1$ at the first point of time. An image 312 of the two eyes 311 of the user at the first point of time may be formed in a focal plane of a lens 300. An image sensor located in the focal plane may sense the image 312. The device 100 may determine the first binocular distance $W_1$ in the image 312 obtained through the image sensor of a camera at the first point of time.

The device 100 according to an embodiment may obtain the second binocular distance $W_2$ at the second point of time. An image 322 of the two eyes 311 of the user at the second point of time may be formed in the focal plane of the lens 300. The image sensor located in the focal plane may sense the image 322. The device 100 may determine the second binocular distance $W_2$ from the image 322 obtained through the image sensor of the camera at the second point of time.

The device 100 according to an embodiment may obtain information about a focal length $D_F$ that is a distance from the lens 300 to the focal plane. The focal length $D_F$ may be determined according to hardware characteristics of the camera or lens. Also, when the image sensor is located in the focal plane, a distance between the lens 300 and the image sensor may be the focal length $D_F$.

The device 100 according to an embodiment may obtain a variation $\Delta D$ of a distance that is a variation of the distance from the two eyes 311 of the user to the lens 300 between the first point of time and the second point of time. The variation $\Delta D$ may indicate a difference between a first distance $D_1$ that is the distance from the two eyes 311 to the lens 300 at the first point of time and a second distance $D_2$ that is the distance from the two eyes 311 to the lens 300 at the second point of time. The device 100 may determine the variation $\Delta D$ by using a sensor included in the device 100 or by using data received from an external source of the device 100. Alternatively, the device 100 may receive information indicating the variation $\Delta D$ from an external source of the device 100.

A distance $W_E$ between the two eyes 311 of the user may be the same at the first point of time and the second point of time. Accordingly, the device 100 may determine the first distance $D_1$ that is the distance from the two eyes 311 to the lens 300 at the first point of time and the second distance $D_2$ that is the distance from the two eyes 311 to the lens 300 at the second point of time, by using the first binocular distance $W_1$, the second binocular distance $W_2$, the focal length $D_F$, and the variation $\Delta D$.

For example, the device 100 may determine the first distance $D_1$ and/or the second distance $D_2$ by using Equations 1 through 3.

$$W_E:D_1=W_1:D_F \qquad \text{Equation 1}$$

$$W_E:D_2=W_2:D_F \qquad \text{Equation 2}$$

$$\Delta D=D_2-D_1 \qquad \text{Equation 3}$$

The device 100 may obtain the first distance $D_1$, the second distance $D_2$, and the distance $W_E$ by using the obtained or determined first binocular distance $W_1$, second binocular distance $W_2$, focal length $D_F$, and variation $\Delta D$, and Equations 1 through 3.

Also, the device 100 according to an embodiment may obtain a plurality of distances from the lens 300 to the two eyes 311, and output a value indicating a distance from the lens 300 to the two eyes 311, which is most recently obtained. For example, the device 100 may output the second distance $D_2$ that is a value more recently obtained from among the first distance $D_1$ and the second distance $D_2$. In this case, the device 100 may display the value indicating the second distance $D_2$.

Figure 4:
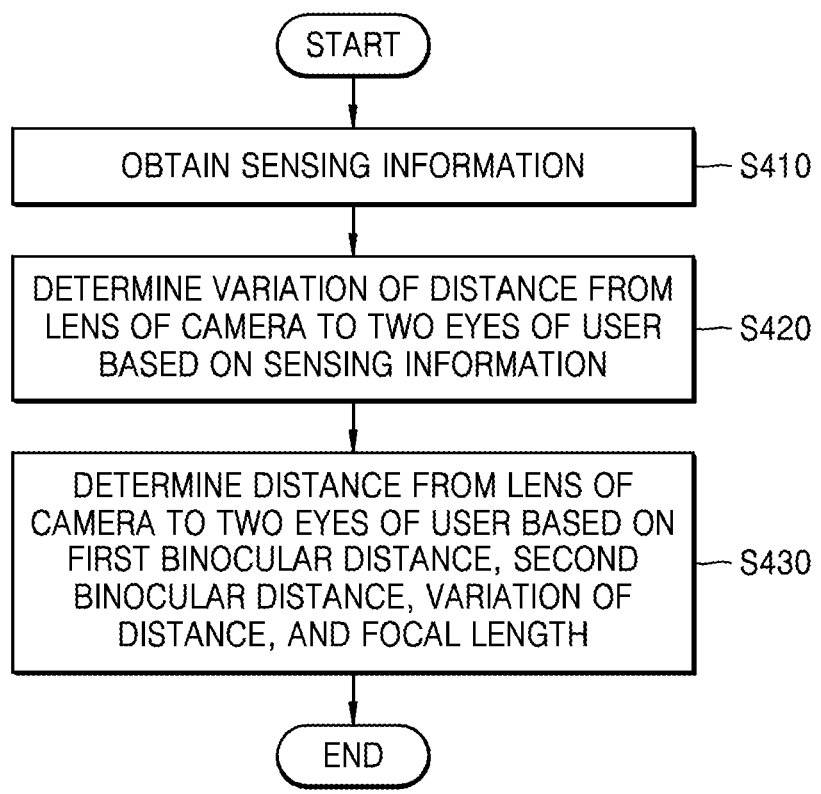
FIG. 4 is a flowchart of a method by which a device determines a distance from the device to a user by using sensing information, according to an embodiment of the present disclosure.

FIG. 4 is a flowchart of a method by which a device determines a distance from the device to a user by using sensing information, according to an embodiment of the present disclosure.

Referring to FIG. 4, the device 100 according to an embodiment may obtain the sensing information in operation S410.

The sensing information may be information obtained from a sensor located inside or outside the device 100.

The sensor according to an embodiment may include a motion sensor. The motion sensor may detect motion of the device 100. The device 100 may detect the motion of the device 100 by using the motion sensor. For example, when the motion sensor is included in or attached to the device 100, the device 100 may determine motion detected by the motion sensor as the motion of the device 100. The device 100 may obtain motion information obtained by the motion sensor. For example, motion information generated by the motion sensor located outside the device 100 may be received from the motion sensor by the device 100.

The sensor according to an embodiment may include a proximity sensor. The proximity sensor may obtain information indicating a variation of a distance from the proximity sensor to the device 100. Also, the device 100 may receive information sensed by the proximity sensor from the proximity sensor located inside or outside the device 100.

Examples of a sensor used by the device 100 to determine a distance may include various sensors used to determine a variation of a distance between the device 100 and the user, and are not limited thereto. For example, the sensor used by the device 100 to determine a distance may include a motion sensor, an acceleration sensor, a gyroscope sensor, and a proximity sensor.

In operation S420, the device 100 according to an embodiment may determine a variation of a distance from a lens of a camera to two eyes of the user based on the sensing information obtained in operation S410.

The device 100 according to an embodiment may obtain the variation of the distance from the lens of the camera to the two eyes of the user, between a first point of time and a second point of time. The variation may indicate a difference between a first distance, i.e., a distance from the two eyes of the user to the lens of the camera at the first point of time, and a second distance, i.e., a distance from the two eyes of the user to the lens of the camera at the second point of time.

When the user is sequentially photographed so as to determine a distance, a point of time corresponding to first photographing may be the first point of time, and a point of time corresponding to second photographing may be the second point of time. For example, when the two eyes of the user are sequentially photographed two times, the first point of time may be a point of time when a first input is received for first photographing, and the second point of time may be a point of time when a second input is received for second photographing. As another example, when the two eyes of the user are sequentially photographed two times, the first point of time may be a point of time when first photographing is performed and the second point of time may be a point of time when second photographing is performed.

In operation S430, the device 100 according to an embodiment may determine a distance from the lens of the camera to the two eyes of the user based on a first binocular distance, a second binocular distance, a variation of the distance, and a focal length of the camera.

According to an embodiment, the first binocular distance may be a distance between the two eyes of the user in a focal plane of the camera at the first point of time, the second binocular distance may be a distance between the two eyes of the user in the focal plane of the camera at the second point of time, the variation of the distance may be the difference between the first distance, i.e., the distance from the two eyes of the user to the lens of the camera at the first point of time, and the second distance, i.e., the distance from the two eyes of the user to the lens of the camera at the second point of time, and the focal length of the camera may be a distance from the lens of the camera to the focal plane of the camera. A distance from the lens of the camera to the two eyes of the user may include the first distance and/or the second distance. For example, the distance from the lens of the camera to the two eyes of the user may be updated to a recent value in real-time.

An example of determining the distance from the lens of the camera to the two eyes of the user have been described above with reference to FIG. 3.

Figure 5:
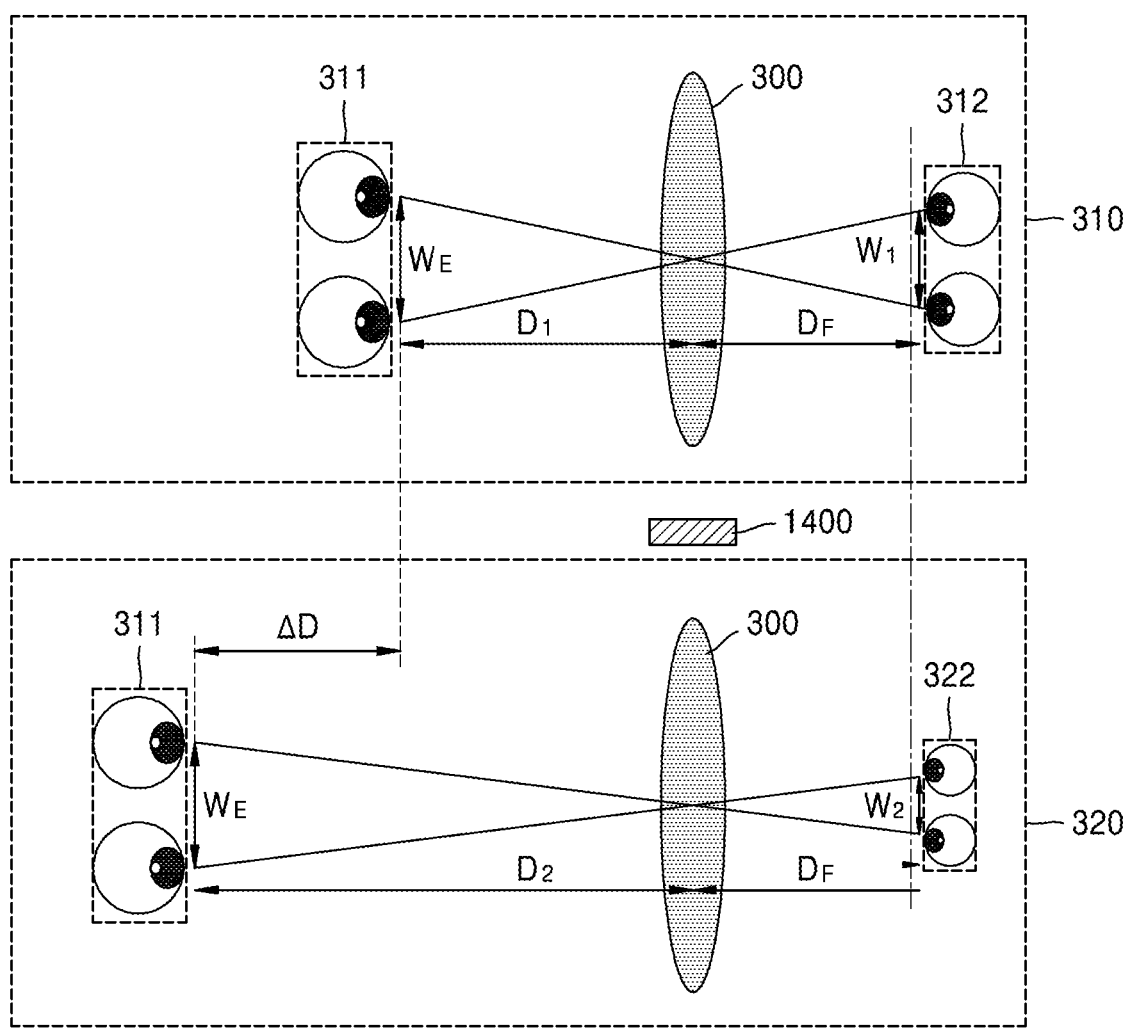
FIG. 5 is a diagram for describing an example in which a device determines a distance from the device to a user by using a first binocular distance, a second binocular distance, and a sensing unit, according to an embodiment of the present disclosure.

FIG. 5 is a diagram for describing an example in which a device determines a distance from the device to a user by using a first binocular distance, a second binocular distance, and a sensing unit, according to an embodiment of the present disclosure.

An example of determining a distance from the device 100 to the user in FIG. 5 has been described above with reference to FIG. 3.

Referring to FIG. 5, a sensing unit may be used to obtain the variation ΔD of the distance. For example, the sensing unit may generate sensing information used to determine the variation ΔD of the distance, i.e., a variation of a distance from the two eyes 311 of the user to the lens 300 between a first point of time and a second point of time.

The sensing unit may include various sensors used to determine the variation of the distance between the device 100 and the user. For example, the sensing unit may include a motion sensor, an acceleration sensor, a gyroscope sensor, and a proximity sensor.

Figure 6:
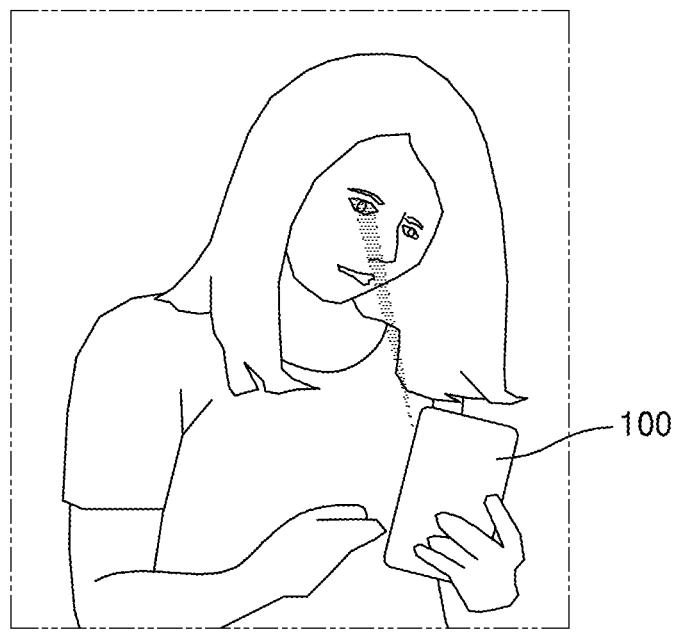
FIG. 6 is a diagram for describing an example in which a device determines a distance from the device to a user by using an eyeball size of the user, according to an embodiment of the present disclosure.

FIG. 6 is a diagram for describing an example in which a device determines a distance from the device to a user by using an eyeball size of the user, according to an embodiment of the present disclosure. For example, the device may determine the distance from the lens of the camera to an eyeball of the user by photographing one eyeball of the user by using one camera.

Referring to FIG. 6, the device 100 according to an embodiment may obtain user information and predict the eyeball size of the user by using the obtained user information. The device 100 may determine the size of the eyeball of the user in the focal plane of the camera. The device 100 may determine the distance from the lens of the camera to the eyeball of the user by comparing the predicted eyeball size and the determined eyeball size.

The device 100 according to an embodiment may determine the distance from the lens of the camera to the eyeball of the user through one photographing operation using one camera.

Alternatively, the device 100 may update the distance from the lens of the camera to the eyeball of the user through a plurality of photographing operations using one camera.

Figure 7:
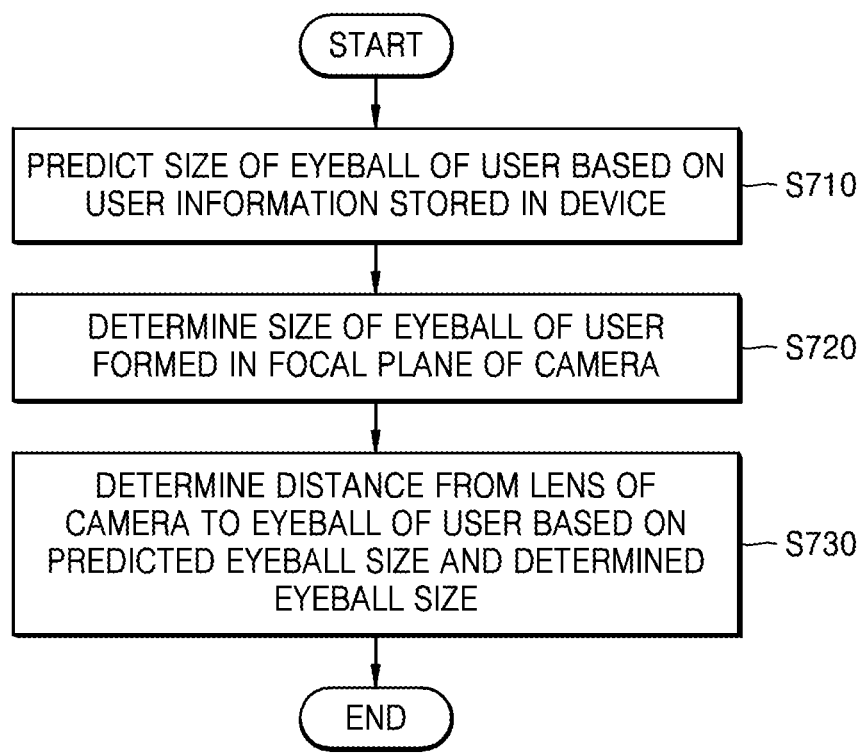
FIG. 7 is a flowchart of a method by which a device determines a distance from the device to a user by using an eyeball size of the user, according to an embodiment of the present disclosure.

FIG. 7 is a flowchart of a method by which a device determines a distance from the device to a user by using an eyeball size of the user, according to an embodiment of the present disclosure.

Referring to FIG. 7, the device 100 according to an embodiment may predict the eyeball size of the user based on user information stored in the device 100 in operation S710.

The device 100 according to an embodiment may store the user information. For example, the device 100 may store the user information about a race, a gender, a nationality, an age, etc., of the user.

The device 100 may predict the eyeball size of the user according to statistics data based on the user information stored in the device 100. For example, the device 100 may predict the eyeball size of the user according to a pre-set table indicating eyeball sizes according to races, genders, ages, etc.

Alternatively, the device 100 may store information about the eyeball size of the user. When the device 100 stores the information about the eyeball size of the user, the device 100 may determine the eyeball size of the user without the predicting.

The user information may be stored in the device 100 or may be received from an external source of the device 100. For example, the device 100 may receive and use the user information from a server (not shown) via a wireless communication.

In operation S720, the device 100 according to an embodiment may determine the size of the eyeball of the user in the focal plane of the camera.

The device 100 may determine the size of the eyeball of the user in the focal plane of the camera through photographing. The size of the eyeball in the focal plane of the camera may be the size of the eyeball of the user in the focal plane of the camera. When the image sensor is located in the focal plane of the camera, the size of the eyeball of the user formed as an image on the image sensor through photographing may be the size of the eyeball of the user in the focal plane of the camera. When the image sensor is located in the focal plane of the camera, the device 100 may determine the size of the eyeball in the focal plane of the camera through the image sensor.

The size of the eyeball in the focal plane of the camera may vary according to the distance from the eyeball to the lens of the camera. For example, the size of the eyeball in the focal plane of the camera may decrease when the distance from the lens of the camera to the eyeball increases.

The camera may be located inside or outside the device 100. When the camera is outside the device 100, the device 100 may obtain information sensed by the image sensor from the camera, and determine the size of the eyeball in the focal plane of the camera by using the sensed information. Alternatively, when the camera is included in the device 100, the device 100 may determine the size of the eyeball in the focal plane of the camera by using the camera inside the device 100.

In operation S730, the device 100 according to an embodiment may determine the distance from the lens of the camera to the eyeball based on the eyeball size predicted in operation S710 and the eyeball size determined in operation S720. Also, the device 100 may use the focal length of the camera while determining the distance from the lens of the camera to the eyeball.

An example of determining the distance from the lens of the camera to the two eyes of the user by photographing the eyeball will be described below with reference to FIG. 8.

Figure 8:
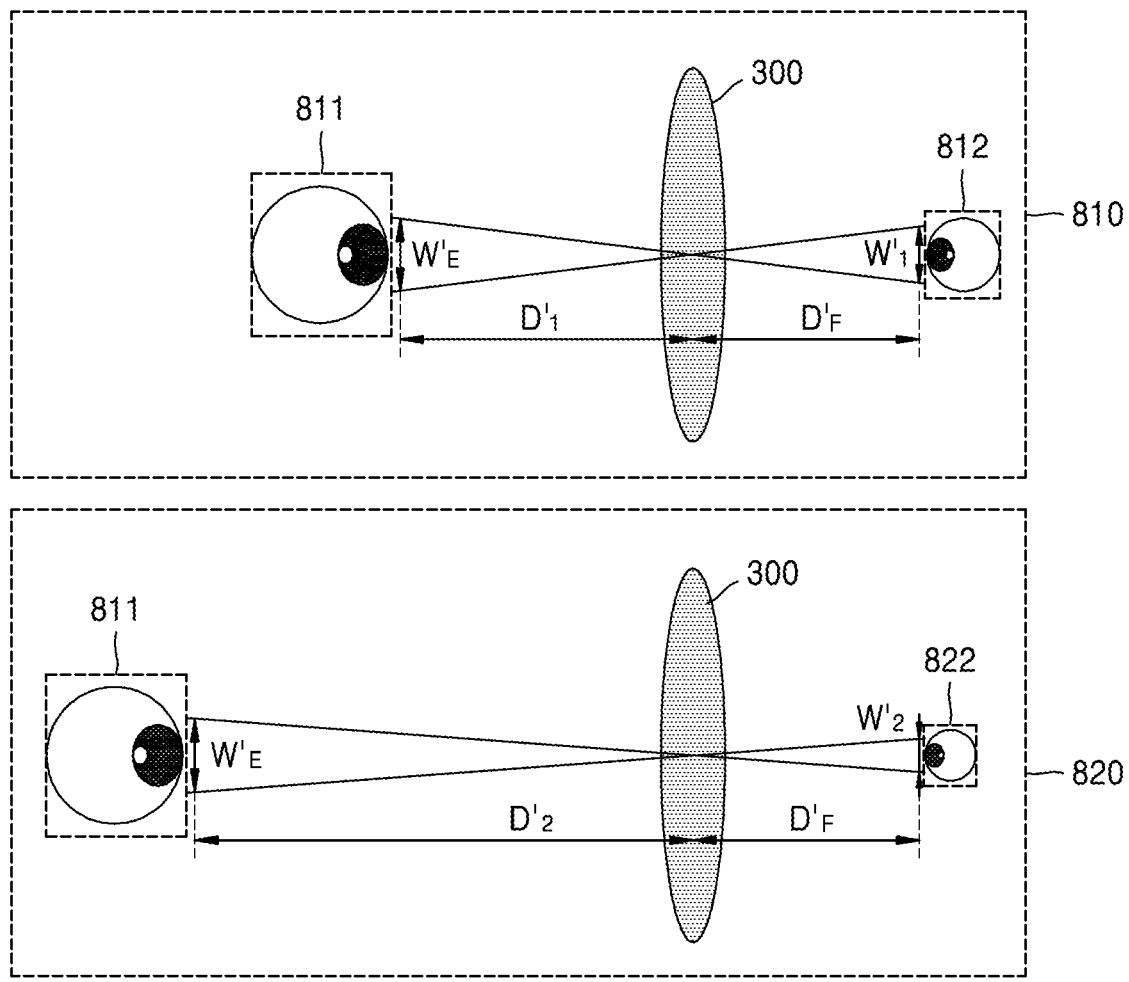
FIG. 8 is a diagram for describing an example in which a device determines a distance from the device to a user by using a predicted eyeball size, according to an embodiment of the present disclosure.

FIG. 8 is a diagram for describing an example in which a device determines a distance from the device to a user by using a predicted eyeball size, according to an embodiment of the present disclosure.

Referring to FIG. 8, the device 100 may determine a first eyeball size $W'_1$ and a second eyeball size $W'_2$ respectively in a first case 810 when an eyeball 811 of the user is photographed at a first point of time and in a case 820 when the eyeball 811 of the user is photographed at a second point of time.

The device 100 according to an embodiment may obtain the first eyeball size $W'_1$ at the first point of time. An image 812 of the eyeball 811 of the user at the first point of time may be formed in a focal plane of the lens 300. An image sensor located in the focal plane may sense the image 812. The device 100 may determine the first eyeball size $W'_1$ in the image 812 obtained through the image sensor of the camera at the first point of time.

The device 100 according to an embodiment may obtain the second eyeball size $W'_2$ at the second point of time. An image 822 of the eyeball 811 of the user at the second point of time may be formed in the focal plane of the lens 300. The image sensor located in the focal plane may sense the image 822. The device 100 may determine the second eyeball size $W'_2$ in the image 822 obtained through the image sensor of the camera at the second point of time.

The device 100 according to an embodiment may obtain information about a focal length $D'_F$ that is a distance from the lens 300 to the focal plane. An example of the focal length $D'_F$ may correspond to that described above with reference to FIG. 3.

The eyeball size $W'_E$ may be the same at the first point of time and the second point of time. Also, the eyeball size $W'_E$ of the user may be predicted or determined based on user information.

The device 100 according to an embodiment may not pre-determine a variation $\Delta D'$ of a distance that is a variation of a distance from the eyeball 811 to the lens 300 between the first point of time and the second point of time, but may determine a first distance $D'_1$ that is a distance from the eyeball 811 to the lens 300 at the first point of time or a second distance $D'_2$ that is a distance from the eyeball 811 to the lens 300 at the second point of time. For example, the device 100 may determine the first distance $D'_1$ or the second distance $D'_2$ without sensing information received from a motion sensor.

For example, the device 100 may determine the first distance $D'_1$ from the eyeball 811 to the lens 300 at the first point of time by using the first eyeball size $W'_1$, the eyeball size $W'_E$, and the focal length $D'_F$. At this time, Equation 4 may be used.

$$W'_E:D'_1 = W'_1:D'_F \qquad \text{Equation 4}$$

As another example, the device 100 may determine the second distance $D'_2$ from the eyeball 811 to the lens 300 at the second point of time by using the second eyeball size $W'_2$, the eyeball size $W'_E$, and the focal length $D'_F$. At this time, Equation 5 may be used.

$$W'_E:D'_2 = W'_2:D'_F \qquad \text{Equation 5}$$

As another example, the device 100 may determine the second distance $D'_2$ by using the first eyeball size $W'_1$, the second eyeball size $W'_2$, and the first distance $D'_1$. At this time, Equation 6 may be used.

$$D'_2 = D'_1 * (W'_1/W'_2) \qquad \text{Equation 6}$$

As described above, the device 100 may determine the first distance $D'_1$ or the second distance $D'_2$ by using Equations 4 through 6.

The device 100 according to an embodiment may determine the distance from the lens 300 of the camera to the eyeball 811 to be a pre-set value when a size of an eyeball in the focal plane is a pre-set size. The device 100 may determine the distance from the lens 300 to the eyeball 811 without information about the focal length $D'_F$. For example, the device 100 may determine the first distance $D'_1$ by using the first eyeball size $W'_1$ and the eyeball size $W'_E$. The device 100 may determine the first distance $D'_1$ to be a pre-set value (for example, 20 cm) when the first eyeball size $W'_1$ is a pre-set size determined according to the eyeball size $W'_E$.

Also, the device 100 according to an embodiment may obtain a plurality of distances from the lens 300 to the eyeball 811, and output a value indicating a most recently obtained distance from the lens 300 to the eyeball 811. For example, the device 100 may output the second distance $D'_2$ that is a more recently obtained value from among the first distance $D'_1$ and the second distance $D'_2$. In this case, the device 100 may display a value indicating the second distance $D'_2$.

Figure 9:
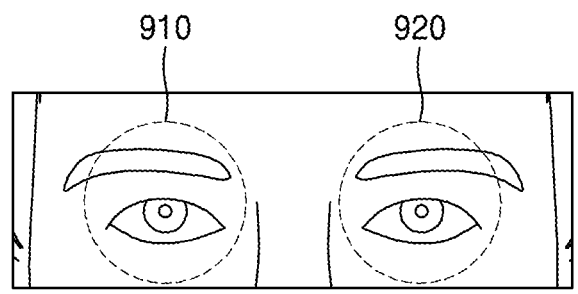
FIG. 9 is a diagram for describing an example in which a device uses a guideline to determine a distance, according to an embodiment of the present disclosure.

FIG. 9 is a diagram for describing an example in which a device uses a guideline to determine a distance, according to an embodiment of the present disclosure.

Referring to FIG. 9, the device 100 according to an embodiment matches a guideline to one eyeball from among eyes of a user. For example, the device 100 may match a first guideline 910 to a right eyeball of the two eyes of the user.

The device 100 according to an embodiment may match the guideline to the eyeball of the user via a pre-set method, and determine a size of the eyeball based on the matched guideline. For example, the device 100 may match the first guideline 910 having a pre-set size to the right eyeball of the user, and determine the pre-set size of the first guideline 910 as the size of the eyeball.

The device 100 according to an embodiment may match the guideline to the eyeball of the user via a pre-set method, and determine a distance from a lens of a camera to the eyeball of the user based on the matched guideline. The device 100 may match the guideline to the eyeball of the user and, when the size of the eyeball and the size of the guideline are matched in a pre-set method, determine the distance between the lens of the camera and the eyeball of the user to be a pre-set value. For example, the device 100 may determine the distance between the lens of the camera and the eyeball of the user to be 20 cm at the moment when an eyelid of the user is included in the first guideline 910 having the pre-set size.

A case in which the device 100 according to an embodiment matches a guideline to each of the two eyes of the user will now be described. For example, the device 100 may match the first guideline 910 to the right eyeball and a second guideline 920 to a left eyeball from among the two eyes of the user.

The device 100 according to an embodiment may match guidelines respectively to the two eyes of the user via a pre-set method, and determine a distance between the two eyes based on a distance between the guidelines. For example, the device 100 may match the first guideline 910 to the right eyeball of the user, match the second guideline 920 to the left eyeball of the user, and determine the distance between the two eyes based on a distance between the first and second guidelines 910 and 920.

Figure 10:
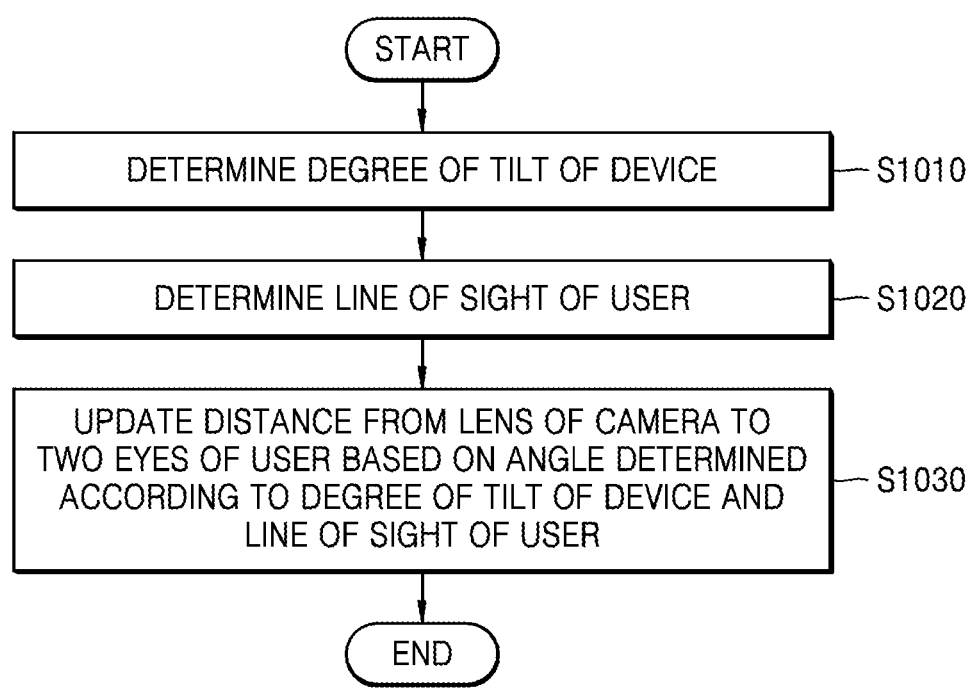
FIG. 10 is a flowchart of a method by which a device determines a distance from the device to a user by using a degree of tilt of the device, according to an embodiment of the present disclosure.

FIG. 10 is a flowchart of a method by which a device determines a distance from the device to a user by using a degree of tilt of the device, according to an embodiment of the present disclosure.

Referring to FIG. 10, the device 100 according to an embodiment may determine the degree of tilt of the device 100 in operation S1010.

The device 100 according to an embodiment may determine the degree of tilt of the device 100 based on a pre-set reference direction. For example, the device 100 may determine the degree of tilt of the device 100 based on a gravity direction. For example, the device 100 may determine degree of tilt of the device 100 according to an angle formed by the gravity direction and a direction of a line perpendicular to a surface of a lens of a camera. The device 100 may determine the degree of tilt of the device 100 to be 0° when the angle formed by the gravity direction and the direction of the line perpendicular to the surface of the lens of the camera is 90°.

The device 100 according to an embodiment may determine the degree of tilt of the device 100 by using a sensor. For example, the device 100 may determine the degree of tilt of the device 100 by using a gravity sensor, a tilt sensor, an acceleration sensor, or a gyroscope sensor, but a type of the sensor is not limited thereto.

In operation S1020, the device 100 according to an embodiment may determine a line of sight of the user. For example, the device 100 may determine the line of sight of the user by using an image of a photographed eyeball.

In operation S1030, the device 100 according to an embodiment may update a distance from the lens of the camera to two eyes of the user based on a value determined according to the degree of tilt of the device 100 determined in operation S1010 and the line of sight of the user determined in operation S1020.

For example, the device 100 may update the distance from the lens of the camera to the two eyes of the user, which is determined according to the method described above with reference to FIGS. 2 through 9, by using an angle determined according to the degree of tilt of the device 100 determined in operation S1010 and the line of sight of the user determined in operation S1020.

Figure 11:
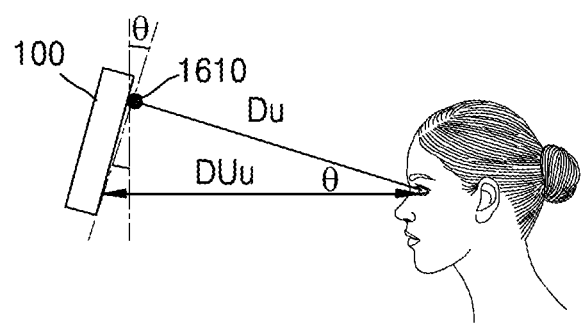
FIG. 11 is a diagram for describing an example in which a device determines a distance from the device to a user when a camera is located higher than a height of two eyes of the user according to an embodiment of the present disclosure.

FIG. 11 is a diagram for describing an example in which a device determines a distance from the device to a user when a camera is located higher than a height of two eyes of the user according to an embodiment of the present disclosure.

Referring to FIG. 11, a distance DUu from the device 100 to the user may be determined according to a distance Du from a camera 1610 to two eyes of the user and an angle θ. For example, when the camera 1610 is located higher than the height of two eyes of the user, the device 100 may determine the distance DUu from the device 100 to the user according to Equation 7. As illustrated in FIG. 11, the angle θ may denote an angle between a gravity direction and a direction of tilt of the device 100.

$$DUu = Du/\cos\theta \qquad \text{Equation 7}$$

Figure 12:
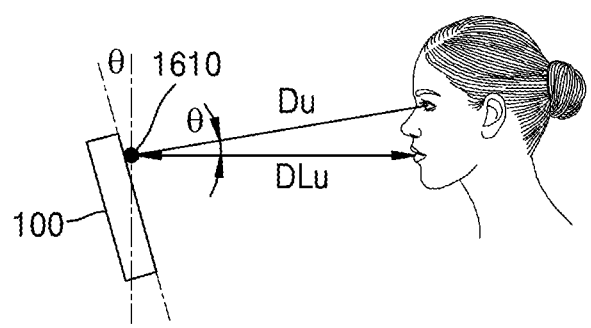
FIG. 12 is a diagram for describing an example in which a device determines a distance from the device to a user when a camera is located lower than a height of two eyes of the user according to an embodiment of the present disclosure.

FIG. 12 is a diagram for describing an example in which a device determines a distance from the device to a user, according to an embodiment, when a camera is located lower than a height of two eyes of the user.

Referring to FIG. 12, a distance DLu from the device 100 to the user may be determined according to the distance Du from the camera 1610 to two eyes of the user and the angle θ. For example, when the camera 1610 is located lower than the height of two eyes of the user, the device 100 may determine the distance DLu from the device 100 to the user according to Equation 8. Referring to FIG. 12, the angle θ may denote an angle between a gravity direction and a direction of tilt of the device 100.

$$DLu = Du*\cos\theta \qquad \text{Equation 8}$$

Figure 13:
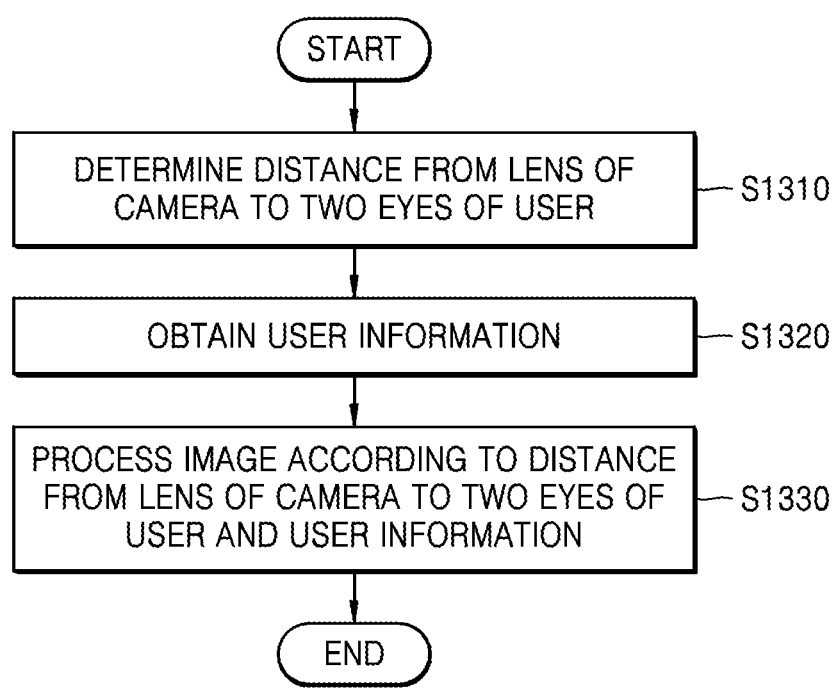
FIG. 13 is a flowchart of a method by which a device processes an image based on a distance from the device to a user and user information, according to an embodiment of the present disclosure.

FIG. 13 is a flowchart of a method by which a device processes an image based on a distance from the device to a user and user information, according to an embodiment of the present disclosure.

Referring to FIG. 13, the device 100 or a server, according to an embodiment, may determine a distance from a lens of a camera to two eyes of the user in operation S1310. A method by which the device 100 or the server determines the distance from the lens of the camera to the two eyes of the user has been described above with reference to FIGS. 1 through 12.

In operation S1320, the device 100 or the server, according to an embodiment, may obtain the user information. For example, the device 100 or the server may store the user information. As another example, the device 100 or the server may receive the user information from an external source (for example, an external device) of the device 100 or the server.

The user information may include visual acuity information of the user. For example, the user information may include information about characteristics (for example, nearsightedness, farsightedness, or astigmatism) of an eyeball of the user and about visual acuity (for example, 1.0 or 0.5) of the user.

The device 100 or the server, according to an embodiment, may provide a service that requires the user to log in. The device 100 or the server may obtain the user information during a login process. For example, the device 100 or the server may obtain visual acuity information input by the user to subscribe to the service that requires the user to log in, during the login process. As another example, the device 100 or the server may obtain information about an enlargement magnification set by the service that requires the user to log in, during the login process.

In operation S1330, the device 100 or the server, according to an embodiment, may process an image to be displayed according to the distance from the lens of the camera to the two eyes of the user determined in operation S1310, and the user information obtained in operation S1320. The image processed by the device 100 may be a 2-dimensional (2D) image and/or a 3D image.

The device 100 according to an embodiment may change a location of a focal plane of the image based on the visual acuity information of the user stored in the device 100. For example, when a characteristic of the eyeball of the user is nearsightedness, the device 100 may change the location of the focal plane of the image being displayed from a location of the device 100 to a location closer to the two eyes of the user. As another example, when the characteristic of the user is farsightedness, the device 100 may change the location of the focal plane of the image being displayed from the location of the device 100 to a location farther from the two eyes of the user.

The device 100 according to an embodiment may adjust directivity of light being displayed based on the visual acuity information stored in the device 100.

When the image to be displayed is processed, the device 100 according to an embodiment may use a light field display method or a pin hole mask method.

The server according to an embodiment may determine the location of the focal plane of the image based on the visual acuity information stored in the server, and obtain a light field image according to the determined location of the focal plane. For example, when the characteristic of the eyeball of the user is nearsightedness, the server may generate the light field image, in which the location of the focal plane of the image to be displayed is determined to be changed from the location of the device 100 to the location closer to the two eyes of the user, and transmit the light field image to the device 100. As another example, when the characteristic of the eyeball of the user is farsightedness, the server may generate the light field image, in which the location of the focal plane of the image to be displayed is determined to be changed from the location of the device 100 to the location farther from the two eyes of the user, and transmit the light field image to the device 100.

The server according to an embodiment may obtain the light field image based on setting information of the user stored in the server. For example, the server may generate the light field image enlarged or reduced according to information about an enlargement magnification set by the user, and transmit the light field image to the device 100.

The device 100 according to an embodiment may display the light field image received from the server. Also, the displayed light field image may be displayed after being modified according to a user environment. For example, the light field image may be displayed with brightness determined according to ambient light of the device 100.

When the server performs operations on the light field image, throughput required by the device 100 may be reduced.

Figure 14:
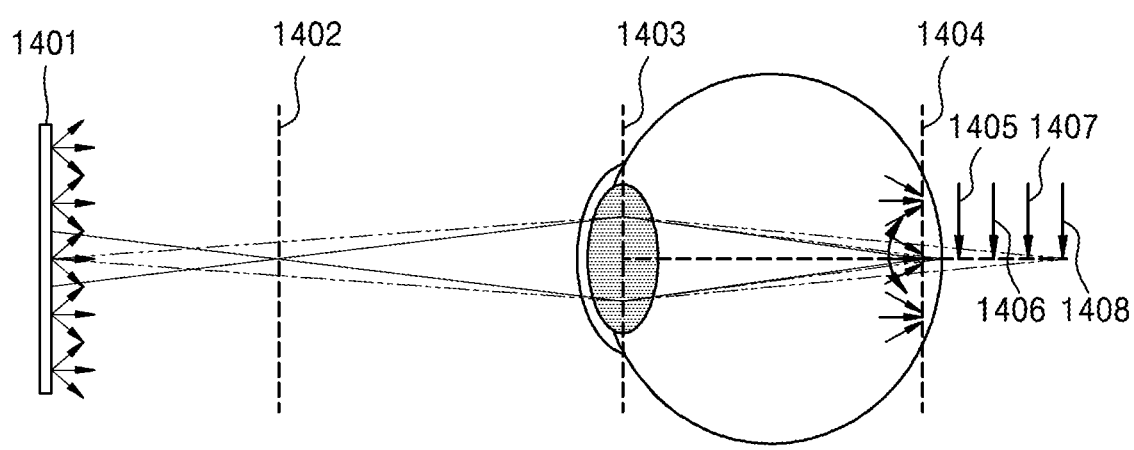
FIG. 14 is a diagram for describing an example in which a device determines a location of a focal plane of an image based on a distance from the device to a user and user information, according to an embodiment of the present disclosure.

FIG. 14 is a diagram for describing an example in which a device determines a location of a focal plane of an image based on a distance from the device to a user and user information, according to an embodiment of the present disclosure.

Referring to FIG. 14, the device 100 according to an embodiment may determine characteristics of an eyeball of the user and visual acuity of the user based on the user information.

When the user is farsighted, an image of an image displayed on a display 1401 may be formed behind a retina 1404 according to the visual acuity of the user (for example, in a first focal plane 1405 of an eye lens 1403, a second focal plane 1406 of the eye lens 1403, a third focal plane 1407 of the eye lens 1403, or a fourth focal plane 1408 of the eye lens 1403). When a distance from a focal plane of the eye lens 1403, in which the image is formed, to the eye lens 1403 is longer than a distance from the retina 1404 to the eye lens 1403, the device 100 may process the image such that a focal plane of the image being displayed is located behind the display 1401.

When the user is nearsighted, the image of the image displayed on the display 1401 may be formed in front of the retina 1404 according to the visual acuity of the user. When the distance from the focal plane of the eye lens 1403, in which the image is formed, to the eye lens 1403 is shorter than the distance from the retina 1404 to the eye lens 1403, the device 100 may process the image such that the focal plane of the image being displayed is located in front of the display 1401. For example, the device 100 may process the image such that the focal plane of the image is located on a zero$^{th}$ focal plane 1402.

Figure 15:
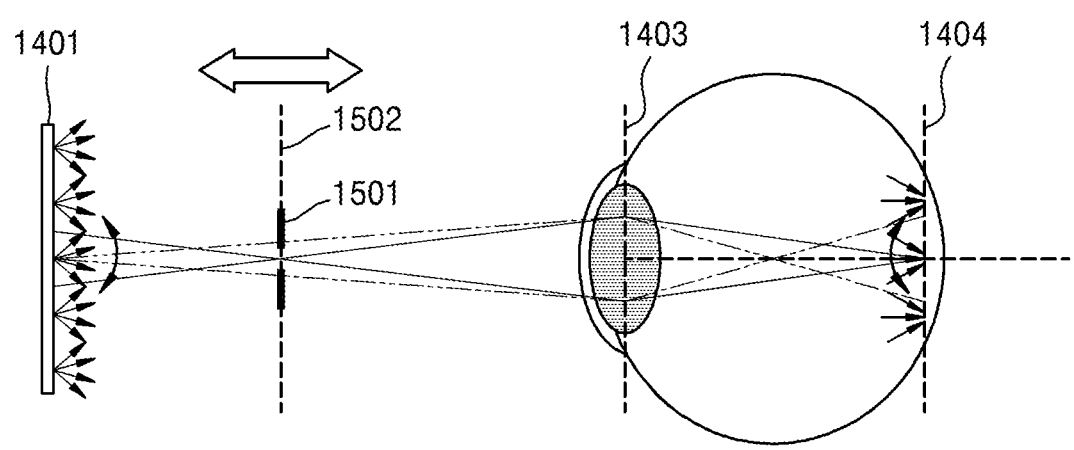
FIG. 15 is a diagram for describing an example in which a device provides an image to a user by using a pinhole mask, according to an embodiment of the present disclosure.

FIG. 15 is a diagram for describing an example in which a device provides an image to a user by using a pinhole mask, according to an embodiment of the present disclosure.

Referring to FIG. 15, a distance between the display 1401 and a pin hole mask 1501 may be pre-determined. Also, the device 100 may process an image such that a focal plane 1502 of the processed image is located at the pin hole mask 1501. The device 100 may control directivity of light of the image being displayed such that an image of the image being displayed on the display 1401 is formed on the retina 1404.

Figure 16:
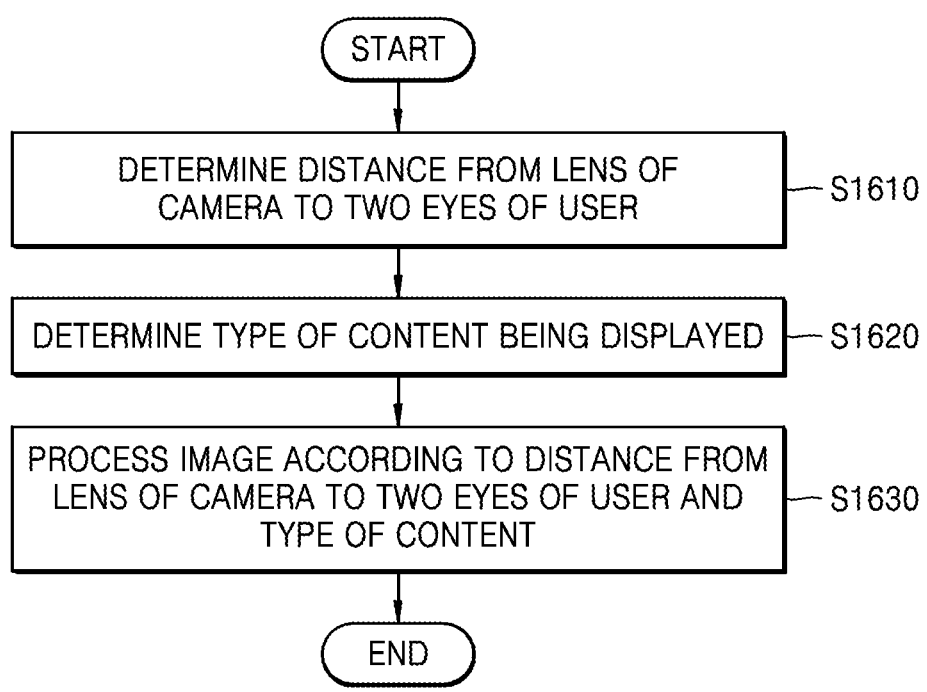
FIG. 16 is a flowchart of a method by which a device processes an image according to a type of content being displayed, according to an embodiment of the present disclosure.

FIG. 16 is a flowchart of a method by which a device processes an image according to a type of content being displayed, according to an embodiment.

Referring to FIG. 16, the device 100 according to an embodiment may determine a distance from a lens of a camera to two eyes of a user in operation S1610. An example by which the device 100 determines the distance from the lens of the camera to the two eyes of the user has been described above with reference to FIGS. 1 through 12.

In operation S1620, the device 100 according to an embodiment may determine the type of the content being displayed. For example, the device 100 may determine whether the content being displayed includes text. As another example, the device 100 may determine what percentage of the content being displayed is text.

In operation S1630, the device 100 according to an embodiment may process an image to be displayed according to the distance determined in operation S1610 and the type of the content determined in operation S1620. For example, when the percentage of the text in the content being displayed is equal to or higher than a certain value, the device 100 may perform outline emphasis filtering on the image to be displayed.

Figure 17:
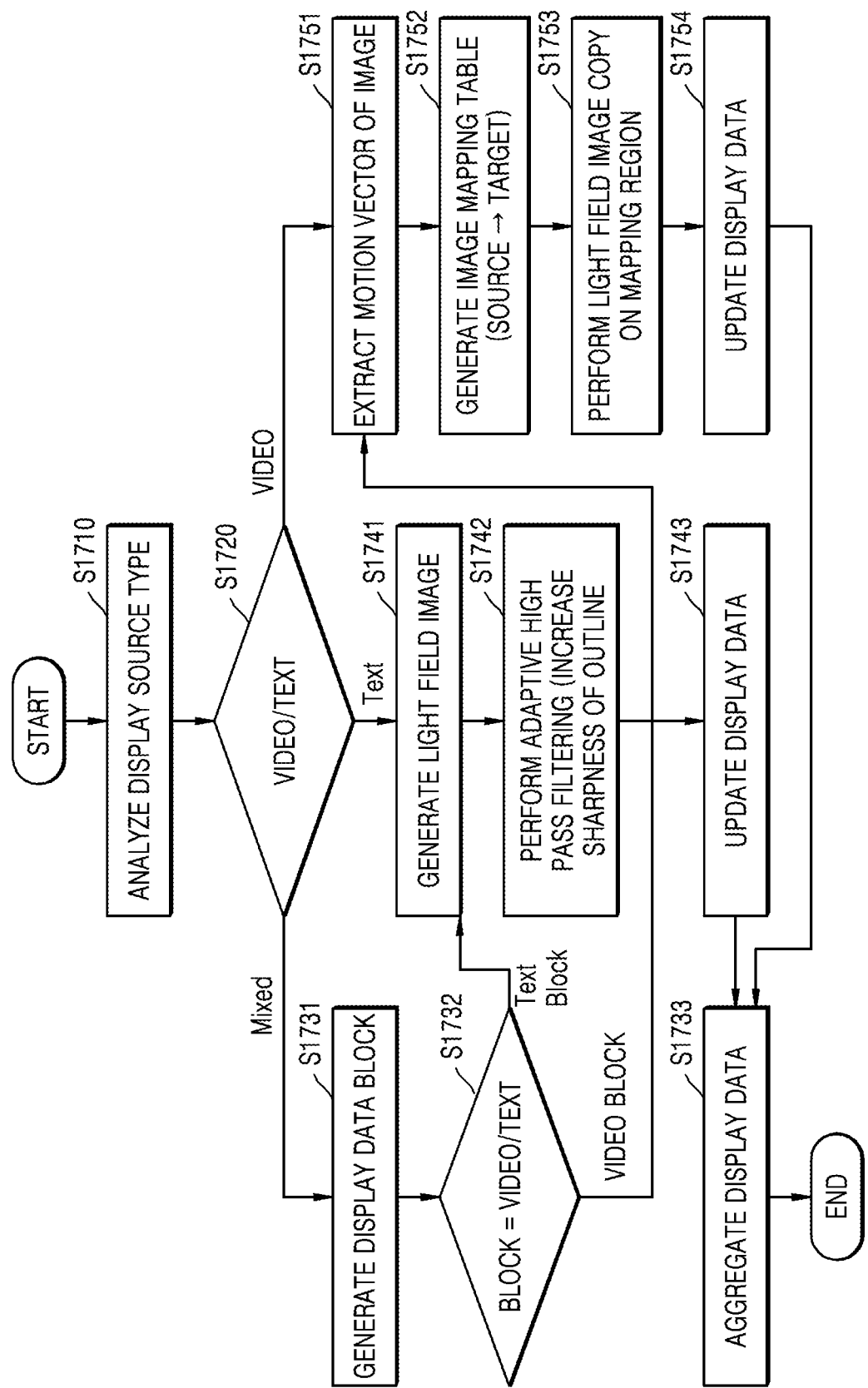
FIG. 17 is a flowchart of a method by which a device processes an image based on whether a type of content being displayed is video or text, according to an embodiment of the present disclosure.

FIG. 17 is a flowchart of a method by which a device processes an image based on whether a type of content being displayed is video or text, according to an embodiment of the present disclosure.

Referring to FIG. 17, the device 100 according to an embodiment may analyze a display source type in operation S1710. For example, the device 100 may distinguish a plurality of pieces of content included in an image being displayed.

In operation S1720, the device 100 according to an embodiment may determine a type of the image being displayed, according to a result of the analyzing in operation S1710. For example, the device 100 may determine whether the content included in the image being displayed is video, text, or both video and text.

In operation S1731, the device 100 according to an embodiment may generate a display data block.

In operation S1732, the device 100 according to an embodiment may determine whether the display data block generated in operation S1731 is a video block or a text block.

In operation S1733, the device 100 according to an embodiment may aggregate display data.

In operation S1741, the device 100 according to an embodiment may generate a light field image.

In operation S1742, the device 100 according to an embodiment may perform adaptive high-pass filtering. At this time, sharpness of an outline of text to be displayed may increase.

In operation S1743, the device 100 according to an embodiment may update the display data.

In operation S1751, the device 100 according to an embodiment may extract a motion vector of the image.

In operation S1752, the device 100 according to an embodiment may generate an image mapping table.

In operation S1753, the device 100 according to an embodiment may perform light field image copying on a mapping region.

In operation S1754, the device 100 according to an embodiment may update the display data.

Figure 18:
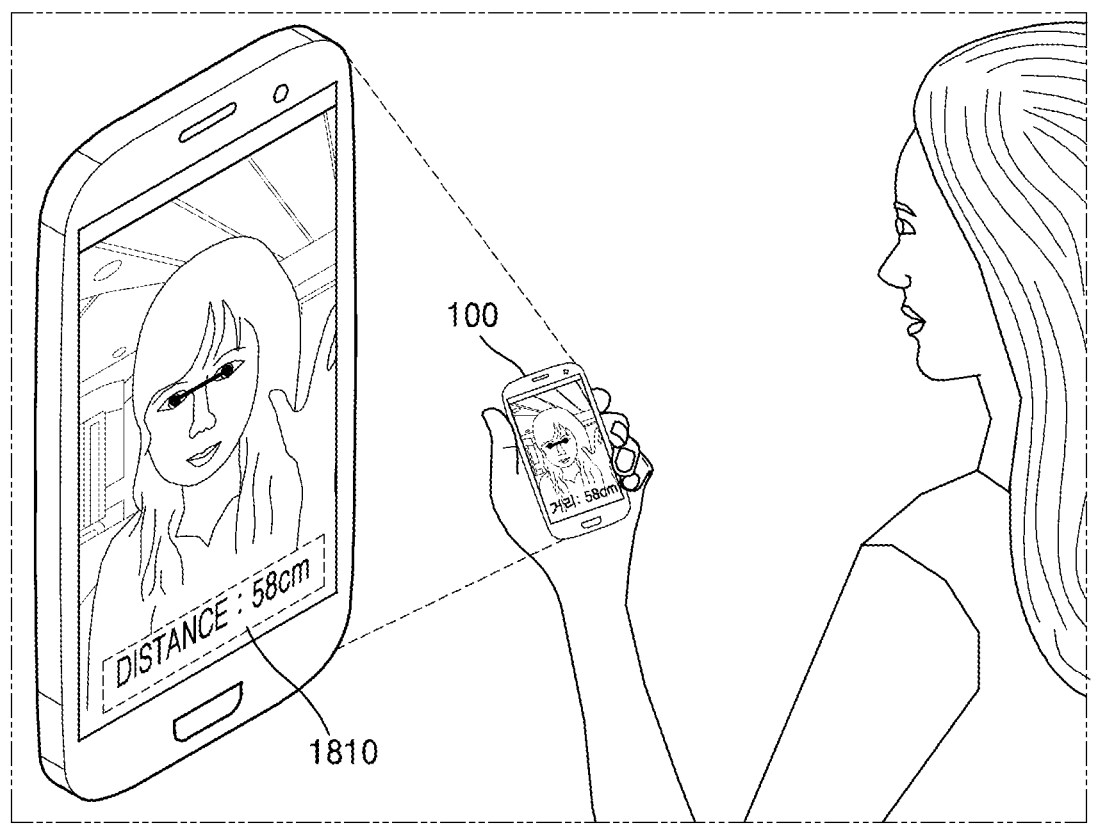
FIG. 18 is a diagram for describing an example in which a device determines a distance between the device and a user, and displays the determined distance, according to an embodiment of the present disclosure.

FIG. 18 is a diagram for describing an example in which a device determines a distance between the device and a user, and displays the determined distance, according to an embodiment of the present disclosure.

Referring to FIG. 18, the device 100 according to an embodiment may determine and display the distance between the device 100 and the user in real-time. For example, the device 100 may continuously update a distance between a lens of a camera and two eyes of the user while filming video. Also, the updated distance between the lens of the camera and the two eyes of the user may be continuously displayed in a pre-set region 1810 of a display. The distance displayed in the pre-set region 1810 may be a most recently determined distance between the user and the device 100.

The device 100 according to an embodiment may display the two eyes of the user detected on a screen. For example, the device 100 may display locations of the two eyes of the user detected on a currently captured image by using dots and lines. In this case, the user may intuitively recognize that the displayed distance is the distance from the device 100 to the two eyes.

Figure 19:
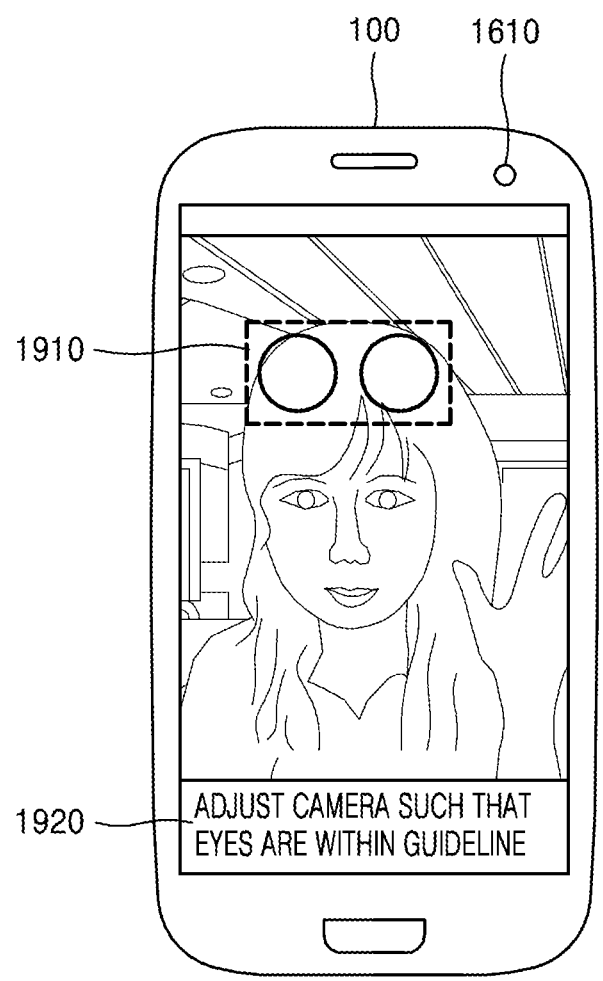
FIG. 19 is a diagram for describing an example in which a device provides a guiding instruction to a user in order to photograph two eyes of the user, according to an embodiment of the present disclosure.

FIG. 19 is a diagram for describing an example in which a device provides a guiding instruction to a user in order to photograph two eyes of the user, according to an embodiment of the present disclosure.

Referring to FIG. 19, when the device 100 according to an embodiment detects the two eyes of the user from a first region 1910, the device 100 may display a guideline in the first region 1910. Also, the device 100 may display, in a second region 1920, an instruction, such as a sentence, requesting the user to adjust a location of the camera 1610 such that the eyes are located in the guideline. When the two eyes are located in the first region 1910, the device 100 may determine a distance from the device 100 to the two eyes of the user by recognizing the two eyes of the user. The distance from the device 100 to the two eyes of the user may include a distance from a lens of the camera 1610 to the two eyes of the user. Alternatively, even when only one eyeball from among the two eyes of the user is detected in the first region 1910, the device 100 may determine a distance from the eyeball to the device 100 by using a size of the detected eyeball. The distance from the eyeball to the device 100 may include a distance from the lens of the camera 1610 to the eyeball.

Figure 20:
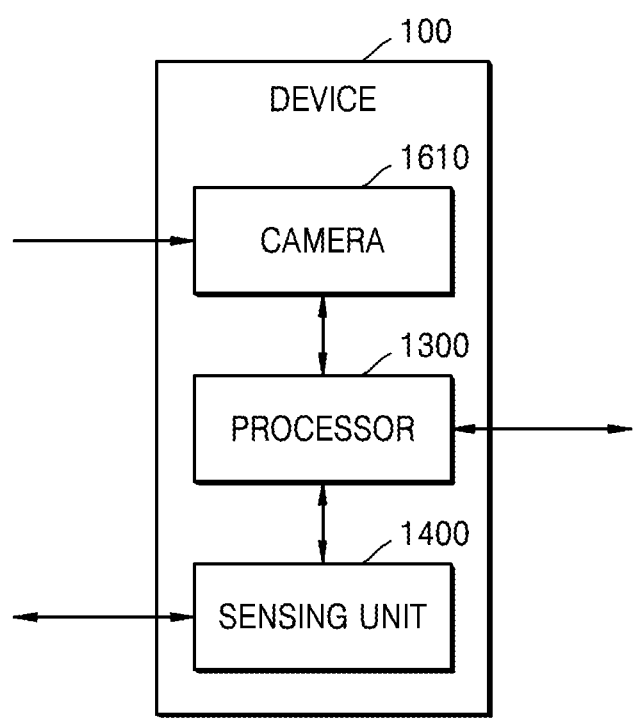

FIGS. 20 and 21 are block diagrams of a device according to various embodiments of the present disclosure.

Referring to FIG. 20, the device 100 according to an embodiment may include the camera 1610, a processor 1300, and the sensing unit 1400. However, not all components shown in FIG. 20 are essential components of the device 100. The device 100 may include more or fewer components than those shown in FIG. 20.

Referring to FIG. 21, the device 100 according to an embodiment may further include, in addition to the camera 1610, the processor 1300, and the sensing unit 1400, a user input unit 1100, an output unit 1200, a communication unit 1500, an audio/video (A/V) input unit 1600, and a memory 1700.

The user input unit 1100 is a unit for a user to input data for controlling the device 100. Examples of the user input unit 1100 include a keypad, a dome switch, a touch pad (a touch capacitance type, a pressure resistance film type, an infrared light detecting type, a surface ultrasound conducting type, an integral tension measuring type, or a piezo-effect type), a jog wheel, and a jog switch, but are not limited thereto.

The user input unit 1100 may capture an image (for example, photograph two eyes of the user), or receive a user input for determining a distance from the device 100 to the user.

The output unit 1200 may output an audio signal, a video signal, or a vibration signal, and may include a display unit 1210, a sound output unit 1220, and a vibration motor 1230.

The display unit 1210 displays information processed by the device 100. For example, the display unit 1210 may display an image captured through the camera 1610. As another example, the display unit 1210 may display an image processed based on the determined distance between the device 100 and the user.

Meanwhile, when the display unit 1210 is configured as a touch screen by forming a layer structure with a touch pad, the display unit 1210 may also be used as an input device as well as an output device. The display unit 1210 may include at least one of a liquid crystal display (LCD), a thin-film-transistor liquid-crystal display (TFT-LCD), an organic light-emitting diode (OLED), a flexible display, a 3D display, and an electrophoretic display. Also, according to an embodiment of the device 100, the device 100 may include at least two display units 1210. Here, the at least two display units 1210 may be disposed to face each other by using a hinge.

The sound output unit 1220 outputs audio data received from the communication unit 1500 or stored in the memory 1700. Also, the sound output unit 1220 outputs a sound signal related to a function performed by the device 100, such as a call signal reception sound, a message reception sound, or an alarm sound. The sound output unit 1220 may include a speaker or a buzzer.

The vibration motor 1230 may output a vibration signal. For example, the vibration motor 1230 may output a vibration signal corresponding to an output of audio data or video data, for example, a call signal reception sound or a message reception sound. Also, the vibration motor 1230 may output a vibration signal when a touch screen is touched.

The processor 1300 controls overall operations of the device 100. For example, the processor 1300 may generally control the user input unit 1100, the output unit 1200, the sensing unit 1400, the communication unit 1500, and the A/V input unit 1600 by executing programs stored in the memory 1700.

The processor 1300 may receive a first input for photographing the two eyes of the user.

The processor 1300 according to an embodiment may receive the first input used to photograph the two eyes of the user. The processor 1300 may photograph the two eyes of the user when a touch input of the user is received. Alternatively, the processor 1300 may receive the first input requesting the device 100 to photograph the two eyes of the user when a pre-set application is performed, without a particular input from the user.

When the first input is received, the processor 1300 may determine a first binocular distance, i.e., a distance between the two eyes of the user in a focal plane of the camera 1610, through an image sensor of the camera 1610.

The processor 1300 may determine the first binocular distance, i.e., the distance between the two eyes of the user in the focal plane of the camera 1610, through photographing according to the first input. The first binocular distance may be the distance between the two eyes of the user in the focal plane of the camera 1610 at a point of time according to the first input. When the image sensor is located in the focal plane of the camera 1610, a distance between an image of a first eyeball and an image of a second eyeball of the user, which are formed on the image sensor through the photographing according to the first input, may be the first binocular distance. When the image sensor is located in the focal plane of the camera 1610, the processor 1300 may determine the first binocular distance through information obtained from the image sensor.

The processor 1300 may receive a second input for photographing the two eyes of the user.

After receiving the first input, the processor 1300 may receive the second input used to photograph the two eyes of the user. For example, the processor 1300 may sequentially receive the first input and the second input requesting the device 100 to photograph the two eyes of the user. For example, the processor 1300 may sequentially receive the first and second inputs according to a touch input of the user received after the first input is received. As another example, the device 100 may sequentially receive the first and second inputs when a pre-set application is performed, without a particular input from the user.

When the second input is received, the processor 1300 may determine a second binocular distance, i.e., a distance between the two eyes of the user in the focal plane of the camera 1610, through the image sensor of the camera 1610.

The processor 1300 may determine the second binocular distance, i.e., the distance between the two eyes of the user in the focal plane of the camera 1610, through photographing according to the second input. The second binocular distance may be the distance between the two eyes of the user on the focal plane of the camera 1610 at a point of time according to the second input. When the image sensor is located in the focal plane of the camera 1610, the distance between the image of the first eyeball and the image of the second eyeball of the user, which are formed on the image sensor through the photographing according to the second input, may be the second binocular distance. When the image sensor is located on the focal plane of the camera 1610, the processor 1300 may determine the second binocular distance through information obtained from the image sensor.

The first binocular distance and the second binocular distance may be different from each other. For example, the first and second binocular distances may be different from each other when distances from the lens of the camera 1610 to the two eyes of the user at a photographing time according to reception of the first input and at a photographing time according to reception of the second input are different from each other.

The processor 1300 may obtain a variation of the distance from the device 100 to the user between when the first input is received and when the second input is received. The processor 1300 may obtain information about motion of the device 100 from when the first input is received to when the second input is received, and obtain the variation of the distance based on the obtained information about the motion. A point of time when the first input or the second input is received may include not only a physical point of time when the first input or the second input is received, but also a point of time when the device 100 performs a pre-set operation according to the first input or the second input. For example, the processor 1300 may obtain the variation of the distance from the lens of the camera 1610 to the two eyes of the user between the photographing time according to the reception of the first input and the photographing time according to the reception of the second input.

The processor 1300 may obtain the variation of the distance by using information obtained from a sensor. The sensor may obtain sensing information. For example, the sensor may obtain motion information of the device 100, and transmit the motion information to the processor 1300.

The processor 1300 may determine a moving distance and a moving direction of the device between the photographing time according to the reception of the first input and the photographing time according to the reception of the second input, by using the motion information obtained by the sensor. The processor 1300 may determine the variation of the distance from the lens of the camera 1610 to the two eyes of the user between the photographing time according to the reception of the first input and the photographing time according to the reception of the second input, based on the determined moving distance and the determined moving direction.

The processor 1300 may obtain a focal length of the camera 1610. The focal length of the camera 1610 may denote the distance from the lens of the camera 1610 to the focal plane of the camera 1610. Also, when the image sensor is located in the focal plane, the focal length of the camera 1610 or the focal length of the lens of the camera 1610 may denote a distance from the lens of the camera 1610 to the image sensor. The focal length of the camera 1610 may be determined according to hardware characteristics of the camera 1610. For example, the focal length of the camera 1610 may be determined according to a refractive index of the lens of the camera 1610.

The processor 1300 may determine the distance between the device 100 and the user based on the first binocular distance, the second binocular distance, and the variation of the distance.

The processor 1300 may compare the first binocular distance and the second binocular distance to determine the distance from the lens of the camera 1610 to the two eyes of the user at the photographing time according to the reception of the first input and/or the distance from the lens of the camera 1610 to the two eyes of the user at the photographing time according to the reception of the second input. For example, the processor 1300 may determine the distance from the lens of the camera 1610 to the two eyes of the user at the photographing time according to the reception of the first input and/or the distance from the lens of the camera

1610 to the two eyes of the user at the photographing time according to the reception of the second input, by using the first binocular distance, the second binocular distance, the variation of the distance, and the focal length of the camera 1610.

The sensing unit 1400 may detect a state of the device 100 or a state around the device 100, and transmit the detected state to the processor 1300.

The sensing unit 1400 may include at least one of a magnetic sensor 1410, an acceleration sensor 1420, a temperature/humidity sensor 1430, an infrared sensor 1440, a gyroscope sensor 1450, a position sensor 1460 such as global positioning system (GPS), an atmospheric sensor 1470, a proximity sensor 1480, and a red, green, blue (RGB) sensor 1490 such as an illuminance sensor, but components included in the sensing unit 1400 are not limited thereto. Because functions of each sensor may be intuitively inferred by one of ordinary skill in the art based on its name, details thereof are not described herein.

The communication unit 1500 may include at least one component enabling the device 100 to communicate with an external device (not shown) or a server (not shown). For example, the communication unit 1500 may include a short-range communication unit 1510, a mobile communication unit 1520, and a broadcast receiving unit 1530.

According to some embodiments, the short-range communication unit 1510 may include a Bluetooth communication unit, a Bluetooth low energy (BLE) communication unit, a near-field communication (NFC) unit, a wireless local area network (WLAN) (Wi-Fi) communication unit, a Zigbee communication unit, an infrared data association (IrDA) communication unit, a Wi-Fi direct (WFD) communication unit, an ultra-wideband (UWB) communication unit, and an Ant+ communication unit, but components included in the short-range communication unit 1510 are not limited thereto.

The mobile communication unit 1520 transmits and receives a wireless signal to and from at least one of a base station, an external terminal, and a server, on a mobile communication network. Here, a wireless signal may include data having various formats according to transmission and reception of a voice call signal, a video telephone call signal, or a text/multimedia message.

The broadcast receiving unit 1530 receives a broadcast signal and/or broadcast related information from an external source, through a broadcast channel. The broadcast channel may include a satellite channel or a terrestrial broadcasting channel. According to an embodiment, the device 100 may not include the broadcast receiving unit 1530.

Also, the communication unit 1500 may exchange information required to determine the distance between the device 100 and the user, with the external device or the server.

The A/V input unit 1600 receives an audio signal or a video signal, and may include the camera 1610 and a microphone 1620. The camera 1610 may obtain an image frame of a still image or a moving image via the image sensor in a video telephone mode or a photographing mode. An image captured via the image sensor may be processed by the processor 1300 or a separate image processor (not shown).

An image frame processed by the camera 1610 may be stored in the memory 1700 or transmitted to an external device through the communication unit 1500. According to an embodiment of the device 100, there may be at least two cameras 1610.

The microphone 1620 receives an external sound signal and processes the external sound signal to electric voice data. For example, the microphone 1620 may receive a sound signal from an external device or a narrator. The microphone 1620 may use any one of various noise removing algorithms to remove noise generated while receiving the external sound signal.

The memory 1700 may store programs for processes and controls of the processor 1300, and may store data input to or output from the device 100.

The memory 1700 may include at least one type of storage medium from among a flash memory, a hard disk, a multimedia card micro-type memory, a card-type memory (for example, a secure digital (SD) card or an extreme digital (XD) card), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

Programs stored in the memory 1700 may be classified into a plurality of modules based on functions, and may be classified into a user interface (UI) module 1710, a touch screen module 1720, and a notification module 1730.

The UI module 1710 may provide a specialized UI or GUI linked to the device 100 according to applications. The touch screen module 1720 may detect a touch gesture of a user on a touch screen, and transmit information about the touch gesture to the processor 1300. The touch screen module 1720 according to an embodiment may recognize and analyze a touch code. The touch screen module 1720 may be configured as separate hardware including a controller.

Various sensors may be disposed inside or around the touch screen to detect a touch or a proximity touch on the touch screen. An example of a sensor for detecting a touch on the touch screen includes a tactile sensor. The tactile sensor detects contact that can be felt by a person on a certain object. The tactile sensor may detect various types of information, such as roughness of a contact surface, rigidness of a contact object, and temperature of a touch point.

Another example of a sensor for detecting a touch on the touch screen includes a proximity sensor.

The proximity sensor detects existence of an object approaching or near a predetermined detection surface by using an electromagnetic field force or infrared ray, without having to detect a mechanical contact. Examples of the proximity sensor include a transmission photoelectric sensor, a direct reflective type photoelectric sensor, a mirror reflective type photoelectric sensor, a high-frequency oscillation proximity sensor, a capacitance-type proximity sensor, a magnetic-type proximity sensor, and an infrared proximity sensor. Examples of a touch gesture of a user include tap, touch and hold, double-tap, drag, panning, flick, drag-and-drop, and swipe.

The notification module 1730 may generate a signal for notifying event generation in the device 100. Examples of an event that is generated in the device 100 include call signal reception, message reception, key signal input, and schedule notification. The notification module 1730 may output a notification signal in a video signal format through the display unit 1210, in an audio signal format through the sound output unit 1220, or in a vibration signal format through the vibration motor 1230.

An embodiment of the present disclosure may also be realized in a form of a computer-readable recording medium, such as a program module executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable command, a data structure, a program module, other data of a modulated data signal, or another transmission mechanism, and an example thereof includes an arbitrary information transmission medium.

Also, in the present specification, a "unit" may be a hardware component, such as a processor or a circuit, and/or a software component executed by a hardware component, such as a processor.

While the present disclosure has been particularly shown and described with reference to example embodiments thereof, it will be understood by those of ordinary skill in the art that various changes in form and details may be made therein without departing from the spirit and scope of the present disclosure as defined by the following claims. Hence, it will be understood that the embodiments described above are not limiting the scope of the disclosure. For example, each component described in a single type may be executed in a distributed manner, and components described distributed may also be executed in an integrated form.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by which a device determines a distance, the method comprising:
   determining a first binocular distance between two eyes of a user by using a first image captured through a camera of the device;
   determining a second binocular distance between the two eyes of the user by using a second image captured through the camera;
   determining a distance from the camera to the two eyes of the user based on the first binocular distance and the second binocular distance, wherein the second binocular distance is different from the first binocular distance; and
   providing an image to a display of the device, the image converted according to the distance from the camera to the two eyes of the user.

2. The method of claim 1,
   wherein the first binocular distance is the distance between the two eyes of the user, and is recognized by an image sensor of the camera when the first image is captured, and
   wherein the second binocular distance is the distance between the two eyes of the user, and is recognized by the image sensor of the camera when the second image is captured.

3. The method of claim 1,
   wherein the first binocular distance is the distance between the two eyes of the user in a focal plane of the camera when the first image is captured, and
   wherein the second binocular distance is the distance between the two eyes of the user in the focal plane of the camera when the second image is captured.

4. The method of claim 2, further comprising:
   obtaining a variation of the distance from the camera to the two eyes of the user,
   wherein the variation of the distance is a variation between when the first image is captured and when the second image is captured, and
   wherein the determining of the distance from the camera to the two eyes of the user comprises determining the distance from the camera to the two eyes of the user based on the variation of the distance.

5. The method of claim 4, wherein the obtaining of the variation of the distance further comprises:
   detecting a motion of the device from when the first image is captured to when the second image is captured, and
   obtaining the variation of the distance based on the motion of the device.

6. The method of claim 1, further comprising:
   obtaining a focal length from a lens of the camera to an image sensor of the camera,
   wherein the determining of the distance from the camera to the two eyes of the user further comprises determining the distance from the camera to the two eyes of the user based on the focal length.

7. The method of claim 1, wherein the providing of the image further comprises obtaining the converted image based on visual acuity information of the user stored in the device.

8. The method of claim 1, further comprising:
   predicting a size of an eyeball of the user based on information about the user stored in the device;
   determining the size of the eyeball of the user located in a focal plane of the camera; and
   determining a distance from the camera to an eyeball of the user based on the predicted eyeball size and the determined eyeball size.

9. The method of claim 8, further comprising:
   obtaining a focal length from a lens of the camera to an image sensor of the camera,
   wherein the determining of the distance from the camera to the eyeball of the user comprises determining the distance from the camera to the eyeball of the user based on the focal length.

10. The method of claim 1, further comprising:
    determining a degree of tilt of the device;
    determining a line of sight of the user; and
    updating the distance from the camera to the two eyes of the user based on an angle determined according to the degree of tilt of the device and the line of sight of the user.

11. A device for determining a distance, the device comprising:
    a camera configured to photograph two eyes of a user; and
    at least one processor configured to:
        determine a first binocular distance between the two eyes of the user by using a first image captured through the camera,
        determine a second binocular distance between the two eyes of the user by using a second image captured through the camera,
        determine a distance from the camera to the two eyes of the user based on the first binocular distance and the second binocular distance, wherein the second binocular distance is different from the first binocular distance, and provide an image to a display of the device, the image converted according to the distance from the camera to the two eyes of the user.

12. The device of claim 11,
wherein the first binocular distance is the distance between the two eyes of the user in the first image formed on an image sensor of the camera when the first image is captured, and
wherein the second binocular distance is the distance between the two eyes of the user in the second image formed on the image sensor of the camera when the second image is captured.

13. The device of claim 11,
wherein the first binocular distance is the distance between the two eyes of the user in a focal plane of the camera when the first image is captured, and
wherein the second binocular distance is the distance between the two eyes of the user in the focal plane of the camera when the second image is captured.

14. The device of claim 12,
wherein the at least one processor is further configured to obtain a variation of the distance from the camera to the two eyes of the user from when the first image is captured to when the second image is captured, and
wherein, to determine the distance from the camera to the two eyes of the user, the at least one processor is further configured to determine the distance from the camera to the two eyes of the user further based on the variation of the distance.

15. The device of claim 14, further comprising:
a motion sensor configured to detect a motion of the device,
wherein the at least one processor is further configured to:
detect the motion of the device from when the first image is captured to when the second image is captured, and
obtain the variation of the distance based on the motion of the device.

16. The device of claim 11, wherein the at least one processor is further configured to:
obtain a focal length from a lens of the camera to an image sensor of the camera, and
determine the distance from the camera to the two eyes of the user based on the focal length.

17. The device of claim 11, wherein the at least one processor is further configured to obtain the converted image based on visual acuity information of the user stored in the device.

18. The device of claim 11, wherein the at least one processor is further configured to:
predict a size of an eyeball of the user based on information about the user stored in the device,
determine the size of the eyeball of the user in a focal plane of the camera, and
determine a distance from the camera to the eyeball of the user based on the predicted eyeball size and the determined eyeball size.

19. The device of claim 18, wherein the at least one processor is further configured to:
obtain a focal length from a lens of the camera to an image sensor of the camera, and
determine the distance from the camera to the eyeball of the user based on the focal length.

20. A non-transitory computer-readable recording medium having recorded thereon a program which, when executed by a computer, performs the method of claim 1.

21. The method of claim 1, further comprising:
capturing the first image using the camera in response to receiving a first input; and
capturing the second image using the camera in response to receiving a second input, different from the first input,
wherein the determining of the distance from the camera to the two eyes of the user is further based on information associated with a time difference between the first input and the second input.

* * * * *